United States Patent
Akabane et al.

(10) Patent No.: US 9,645,319 B2
(45) Date of Patent: May 9, 2017

(54) OPTICAL CONNECTOR

(71) Applicant: FUJITSU COMPONENT LIMITED, Tokyo (JP)

(72) Inventors: Ayumu Akabane, Tokyo (JP); Shinichiro Akieda, Tokyo (JP); Hongfei Zhang, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/060,772

(22) Filed: Mar. 4, 2016

(65) Prior Publication Data

US 2016/0266324 A1    Sep. 15, 2016

(30) Foreign Application Priority Data

Mar. 12, 2015    (JP) ................................ 2015-049929

(51) Int. Cl.
*G02B 6/36* (2006.01)
*G02B 6/32* (2006.01)
*G02B 6/38* (2006.01)

(52) U.S. Cl.
CPC ........... *G02B 6/322* (2013.01); *G02B 6/3853* (2013.01); *G02B 6/3882* (2013.01); *G02B 6/3885* (2013.01)

(58) Field of Classification Search
None
See application file for complete search history.

(56) References Cited

U.S. PATENT DOCUMENTS

| | | | | |
|---|---|---|---|---|
| 7,887,243 B2* | 2/2011 | Abel | .................... | G02B 6/2817 385/44 |
| 8,611,706 B1* | 12/2013 | Thorson | ............... | G02B 6/3518 385/18 |
| 8,876,401 B2 | 11/2014 | Shiraishi | | |
| 2003/0152326 A1* | 8/2003 | Morimoto | .............. | G02B 6/266 385/34 |
| 2006/0245694 A1* | 11/2006 | Chen | ........................ | G02B 6/32 385/71 |
| 2007/0058904 A1* | 3/2007 | Ban | ...................... | G02B 6/4204 385/52 |
| 2008/0036103 A1* | 2/2008 | Ban | ...................... | G02B 6/4206 264/1.25 |
| 2010/0215319 A1* | 8/2010 | Childers | .............. | G02B 6/3885 385/60 |
| 2010/0266245 A1* | 10/2010 | Sabo | .................... | G02B 6/3825 385/79 |
| 2014/0143996 A1* | 5/2014 | Bhagavatula | ........ | G02B 3/0087 29/428 |
| 2014/0321814 A1* | 10/2014 | Chen | .................... | G02B 6/3825 385/79 |

FOREIGN PATENT DOCUMENTS

| JP | 2008-089879 | 4/2008 |
|---|---|---|
| JP | 2013-020027 | 1/2013 |

* cited by examiner

*Primary Examiner* — Mike Stahl
(74) *Attorney, Agent, or Firm* — IPUSA, PLLC

(57) ABSTRACT

An optical connector connectable to another optical connector includes an optical waveguide that includes a core, an attachment part to which the optical waveguide is attached, a lens part in which a positioning hole is formed, and a positioning pin that is provided on the attachment part and inserted through the positioning hole. The lens part and the attachment part are joined with the positioning pin being inserted into the positioning hole.

11 Claims, 29 Drawing Sheets

FOCAL POINT OF LIGHT

OPTICAL CONNECTOR

CROSS-REFERENCE TO RELATED APPLICATION

The present application is based upon and claims the benefit of priority of Japanese Patent Application No. 2015-049929, filed on Mar. 12, 2015, the entire contents of which are incorporated herein by reference.

BACKGROUND OF THE INVENTION

1. Field of the Invention

The present invention relates to optical connectors.

2. Description of the Related Art

In recent years, optical transmission in which crosstalk is less likely to occur and which is thus suitable for high-speed, high-capacity transmission has become popular. In optical transmission, optical connectors are employed to connect optical fibers and optical waveguides.

Optical connectors include mechanically transferable (MT) connectors. According to the MT connector, for example, an optical waveguide is connected to a first connector, and an optical waveguide or optical fibers are connected to a second connector. The first and second connectors are connected so that a signal is transmitted through the first and second connectors.

Reference may be made to, for example, Japanese Laid-Open Patent application Nos. 2013-20027 and 2008-89879 for related art.

SUMMARY OF THE INVENTION

According to an aspect of the present invention, an optical connector connectable to another optical connector includes an optical waveguide that includes a core, an attachment part to which the optical waveguide is attached, a lens part in which a positioning hole is formed, and a positioning pin that is provided on the attachment part and inserted through the positioning hole. The lens part and the attachment part are joined with the positioning pin being inserted into the positioning hole.

DESCRIPTION OF THE EMBODIMENTS

Figure 1:
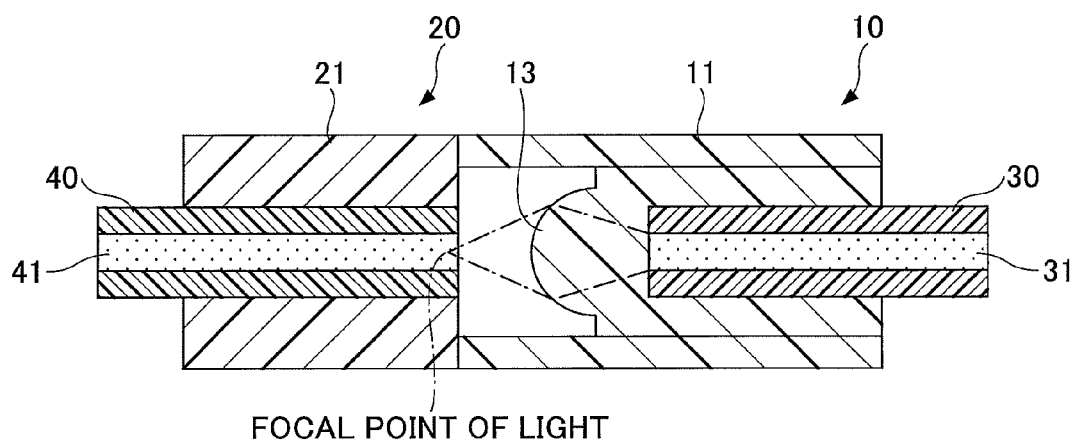
FIG. 1 is a diagram illustrating connection of an MT connector.

First and second connectors of an MT connector may be formed by molding a resin material. If the connector bodies are not formed in a desired shape because of manufacturing error or the effect of cure shrinkage, an optical waveguide may not be connected to a desired position, and light exiting from the first connector may not enter the second connector.

Accordingly, there is a demand for optical connectors in which an optical waveguide is connected to a desired position.

Embodiments of the present invention are described below with reference to the accompanying drawings. In the following description, the same elements are referred to using the same reference numeral, and descriptions thereof will not be repeated.

Referring to FIG. 1, an optical connector 10 and an optical connector 20 (hereinafter referred to as "connector 10" and "connector 20," respectively) are connected, so that optical signals are transmitted between the connectors 10 and 20. The connector 10 includes a connector body 11 and an optical waveguide 30 (hereinafter "waveguide 30") connected to the connector body 11. The connector 20 includes a connector body 21 and an optical waveguide 40 (hereinafter "waveguide 40") connected to the connector body 21. The waveguide 30 has a sheet or film shape. Optical fibers may be connected to the connector body 21 instead of the waveguide 40.

The waveguides 30 and 40 are formed of resin such as polymer. Cores 31 and 41, which serve as optical paths, are formed in the waveguides 30 and 40, respectively. Lenses 13 are integrally formed with the connector body 11 near the end of the waveguide 30 connected to the connector body 11. In FIG. 1, one core 31, one core 41, and one lens 13 are illustrated. Light exiting from the core 31 is gathered by the lens 13 to enter the core 41. The focal point of the light is near an end face of the core 41. The lens 13 is formed of a material that transmits light. When the lens 13 is formed in part of the connector body 11, the overall connector body 11 is formed of a transparent resin material. Such a transparent resin material satisfies predetermined optical properties and is also referred to by "optical grade."

The waveguide 30 and the lens 13 are required to be in a predetermined positional relationship. Furthermore, the connector 10 and the connector 20 are required to be connected at a predetermined position, that is, the connector 10 and the connector 20 are required to be connected so that the focal point of light gathered by the lens 13 is near the end face of the core 41.

Figure 2A:
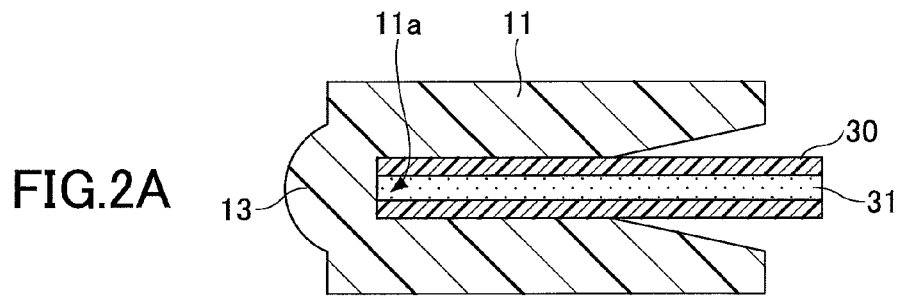
FIGS. 2A and 2B are diagrams illustrating methods of manufacturing an MT connector.

A groove 11a of such a size as to allow entry of the waveguide 30 in the connector body 11 may be formed and the waveguide 30 may be inserted into the groove 11a as illustrated in FIG. 2A. Accordingly, it is possible to manufacture the connector 10 by inserting the waveguide 30 into the groove 11a and bonding the optical waveguide 30 to the groove 11a. Therefore, it is possible to easily manufacture the connector 10 in a short time. The connector body 11, however, may not be formed with a desired size because the requirement of using a resin material satisfying optical requirements prevents resin selection in favor of formability. Furthermore, because the position of the waveguide 30 is determined by the groove 11a formed in the connector body 11, the groove 11a is required to be formed with high position and size accuracy. The groove 11a is required to be equal in size to the waveguide 30 and is as thin as, for example, approximately 100 μm, and a part of a mold for forming the groove 11a has to be as thin as 100 μm and easily bendable. Therefore, it is difficult to form the groove 11a exactly with high accuracy.

Figure 2B:
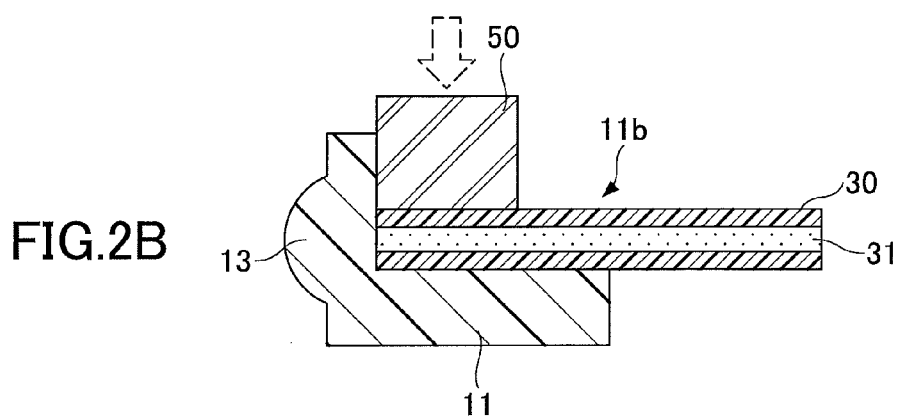

Alternatively, as illustrated in FIG. 2B, a groove 11a that is open on one side may be formed in the connector body 11. When bonding the waveguide 30 to the connector body 11, the waveguide 30 is pressed against a surface of the connector body 11 that defines the groove 11b using a jig 50 as indicated by a broken-line arrow. According to this method, compared with FIG. 2A, it is possible to increase the thickness of part of the mold for forming the groove 11b, and the groove 11b can be formed at a desired position in the connector body 11. However, as the waveguide 30 is positioned using the jig 50, the number of manufacturing processes and the manufacturing time increase, thus increasing cost. Furthermore, because the groove 11b is open on one side, part of the connector body 11 that supports the lens 13 is easy to bend, thus leaving the position of the lens 13 unstable.

Figure 3:
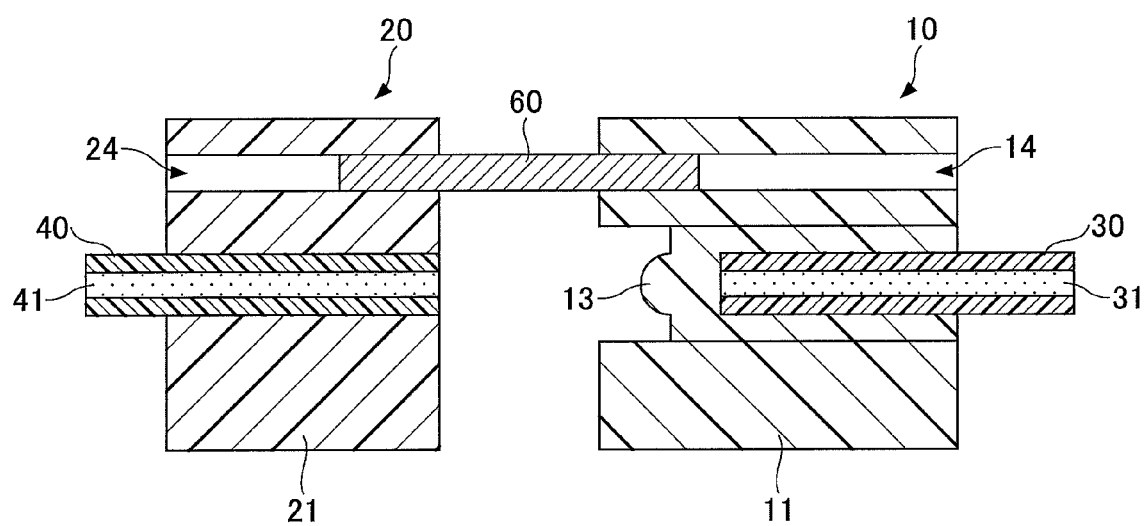
FIG. 3 is a diagram illustrating a method of connecting optical connectors.

Furthermore, the connector 10 and the connector 20 may be connected at a desired position using pins 60 as illustrated in FIG. 3. Pin holes 14 are provided in the connector body 11, and pin holes 24 are provided in the connector body 21 at positions corresponding to the pin holes 14. Each pin 60 is inserted into one of the pin holes 14 and one of the pin holes 24. In FIG. 3, one pin 60, one pin hole 14, and one pin hole 24 are illustrated.

[a] First Embodiment

Figure 4:
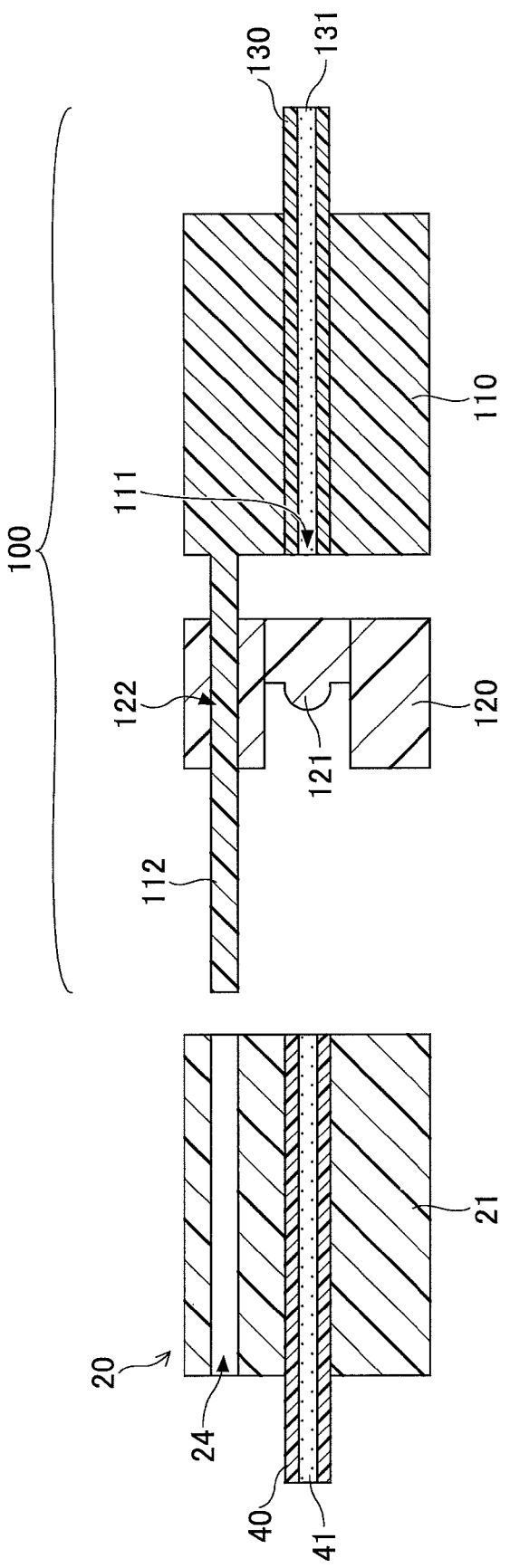
FIG. 4 is a diagram illustrating an optical connector according to a first embodiment.

Next, an optical connector according to a first embodiment is described. FIG. 4 is a schematic diagram illustrating an optical connector according to this embodiment. Referring to FIG. 4, an optical connector 100 (hereinafter "connector 100") according to this embodiment includes an attachment part 110 to which an optical waveguide 130 (hereinafter "waveguide 130") is attached, and a lens part 120. The attachment part 110 is formed of a polyphenylene sulfide (PPS) resin, and includes a groove 111 into which the waveguide 130 is inserted, and pins 112 serving as positioning members for positioning the attachment part 110 relative to the connector 20. Cores 131 serving as optical paths are formed in the waveguide 130, and the waveguide 130 is inserted into the groove 111. The lens part 120 is formed of a cycloolefin polymer (COP), and includes lenses 121 and pin holes 122.

The lenses 121 are formed of COP to satisfy desired optical conditions. On the other hand, a material for parts other than the lens part 120 which do not have to satisfy desired optical conditions may be selected from a wider variety of resin materials that are inexpensive and have good formability. Accordingly, the attachment part 110 may be formed of a PPS resin, which is less expensive than COP.

The pin holes 122 are formed in the lens part 120 so that by inserting the pins 112 into the pin holes 122, the lenses 121 and the cores 131 of the waveguide 130 connected to the attachment part 110 are in a desired positional relationship.

The connector 100 is formed by connecting the attachment part 110 and the lens part 120. The connector 100 and the connector 20 are connected by inserting the pins 112 into the pin holes 24 of the connector 20.

According to this embodiment, the attachment part 110 is formed of a PPS resin that is susceptible of little cure shrinkage. Accordingly, it is possible to form the groove 111 for inserting the waveguide 130 at a desired position with high accuracy. Furthermore, by integrally forming the pins 112 with the attachment part 110, it is possible to reduce the number of components. Furthermore, the lens part 120 alone is formed of a transparent resin material. Accordingly, it is possible to reduce use of an expensive transparent resin material, so that it is possible to reduce cost.

Figure 5A:
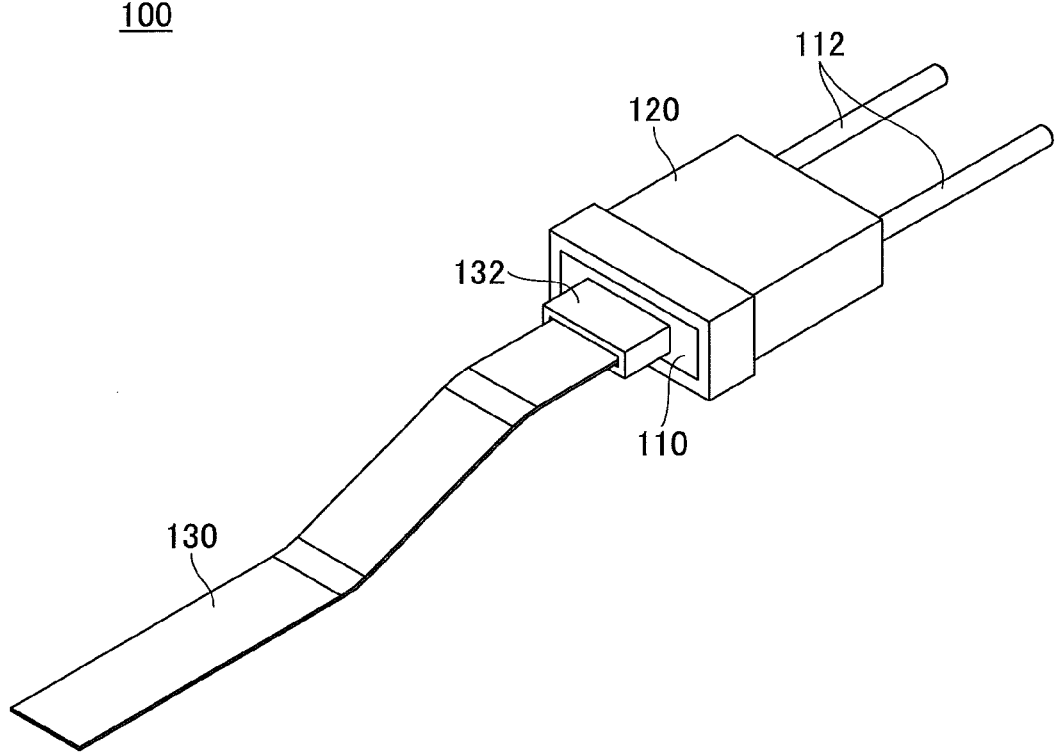
FIGS. 5A and 5B are perspective views of the optical connector according to the first embodiment.
Figure 5B:
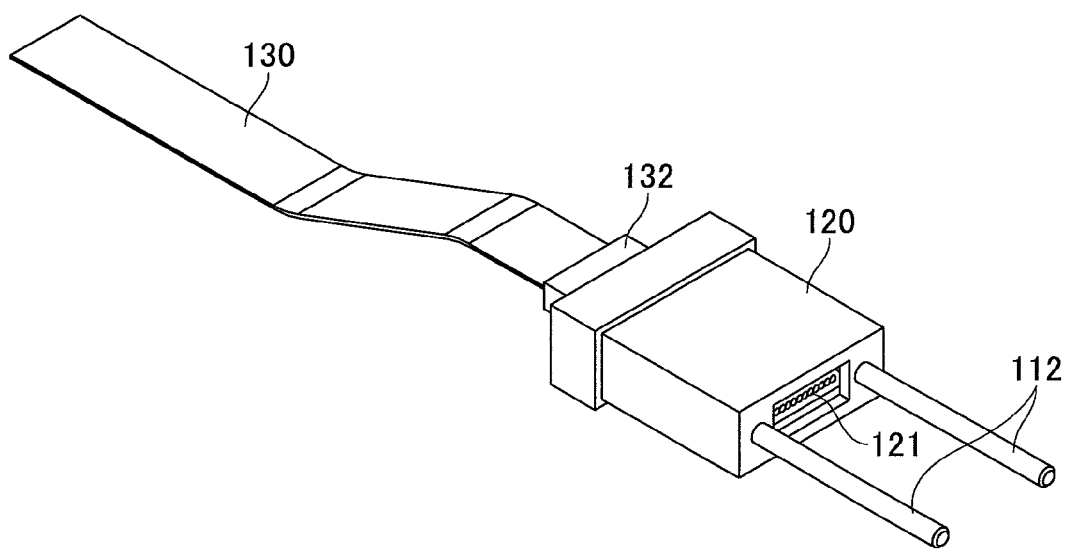
Figure 6A:
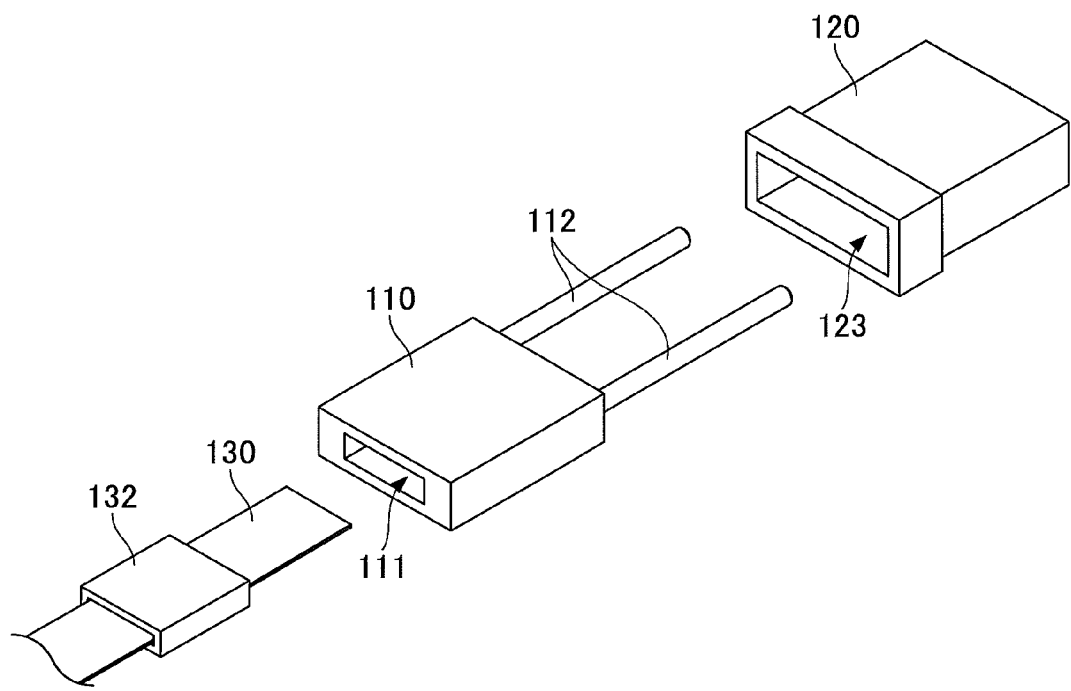
FIGS. 6A and 6B are exploded perspective views of the optical connector according to the first embodiment.
Figure 6B:
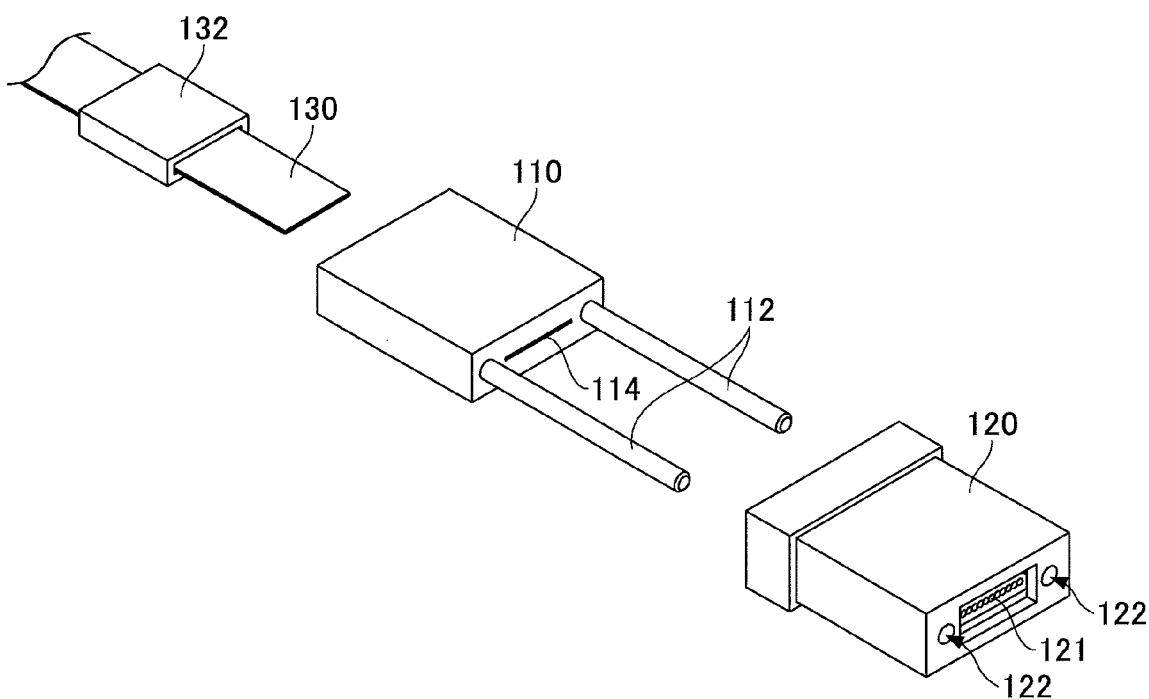
Figure 7A:
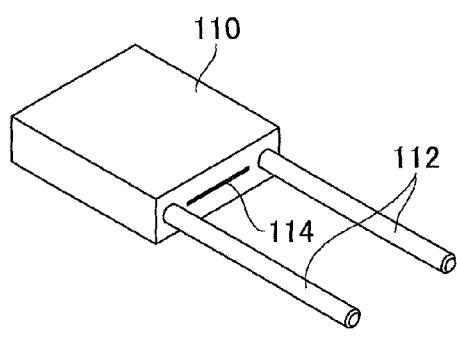
FIGS. 7A and 7B are perspective views of an attachment part according to the first embodiment.
Figure 7B:
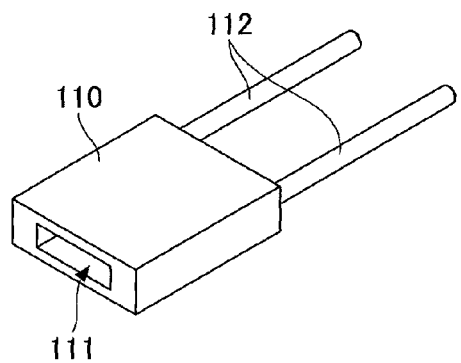
Figure 8A:
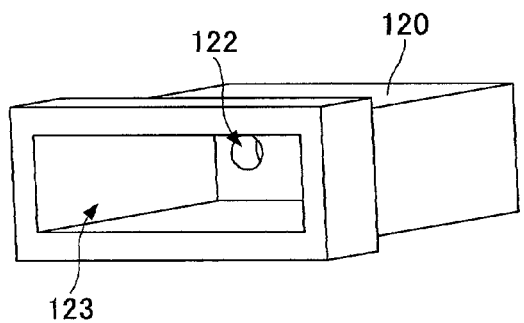
FIGS. 8A and 8B are perspective views of a lens part according to the first embodiment.
Figure 8B:
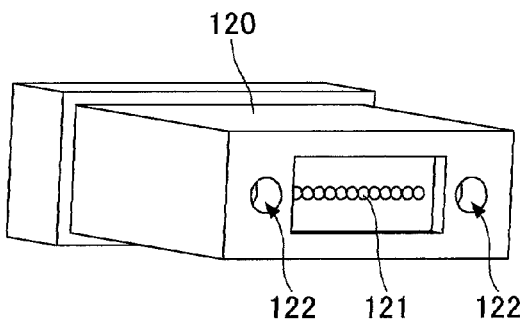
Figure 9A:
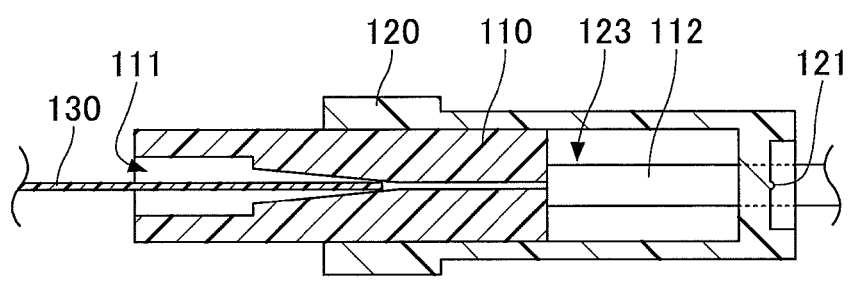
FIGS. 9A and 9B are diagrams illustrating a method of manufacturing an optical connector according to the first embodiment.
Figure 9B:
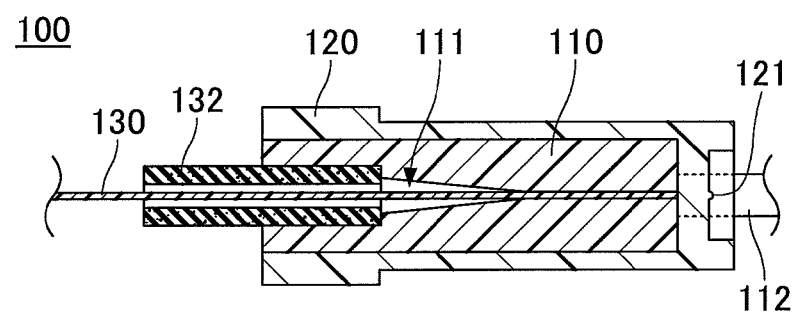

The connector 100 is described in more detail with reference to FIGS. 5A through 9B. FIGS. 5A and 5B are perspective views of the connector 100, where the attachment part 110 is attached to the lens part 120. FIGS. 6A and 6B are exploded perspective views of the connector 100. FIGS. 7A and 7B are perspective views of the attachment part 110. FIGS. 8A and 8B are perspective views of the lens part 120. FIGS. 9A and 9B are diagrams illustrating a method of manufacturing a connector according to this embodiment.

Referring to FIGS. 63 and 8B, the lenses 121 are formed in an array in the lens part 120, and the pin holes 122 are provided across the array of the lenses 121 from each other. The pin holes 122 penetrate through the lens part 120. The lens part 120 has a geometry compliant with the MT connector standard. A hole 123 for inserting the attachment part 110 is formed in the lens part 120.

Referring to FIGS. 6A through 7B, the attachment part 110 includes the groove 111 for inserting the waveguide 130, and the two pins 112. A slit 114 from which an end of the waveguide 130 is exposed is formed on a surface of the attachment part 110 between the two pins 112. The pins 112 are inserted through the pin holes 122 and are inserted into pin holes provided in a complementary connector that is connected to the connector 100. Furthermore, a protection boot 132 (hereinafter "boot 132") for protecting the waveguide 130 from bending is provided around an intermediate portion of the waveguide 130. According to this embodiment, an end portion of the boot 132 is inserted into the groove 111 as illustrated in FIG. 9B.

The connector 100 is manufactured as follows. First, as illustrated in FIG. 9A, the attachment part 110 is inserted into the hole 123, the pins 112 are inserted through the pin holes 122, and the waveguide 130 is inserted into the groove 111. Then, as illustrated in FIG. 9B, the attachment part 110 is further inserted into the hole 123 until an end of the attachment part 110 comes into contact with an inner wall surface of the lens part 120. Then, the lens part 120 and the attachment part 110 are fixed by, for example, bonding, and the attachment part 110 and the waveguide 130 are fixed by, for example, bonding.

The waveguide 130 may be inserted into the groove 111 of the attachment part 110 either before or after inserting the attachment part 110 into the hole 123 and inserting the pins 112 through the pin holes 122.

According to this embodiment, the attachment part 110 is formed of a resin material that is susceptible of little cure shrinkage. Therefore, the pins 112 and the groove 111 can be formed at desired positions relative to each other. As a result, the attachment part 110 and the lens part 120 are positioned relative to each other by the pins 112 and the pin holes 122, so that it is possible to join the lens part 120 and the attachment part 110 so that the cores 131 and the lenses 121 are in a desired positional relationship.

The groove 111 gradually narrows vertically from a portion into which the protection boot 132 is inserted toward the slit 114, so as to guide the end of the waveguide 130.

[b] Second Embodiment

Figure 10A:
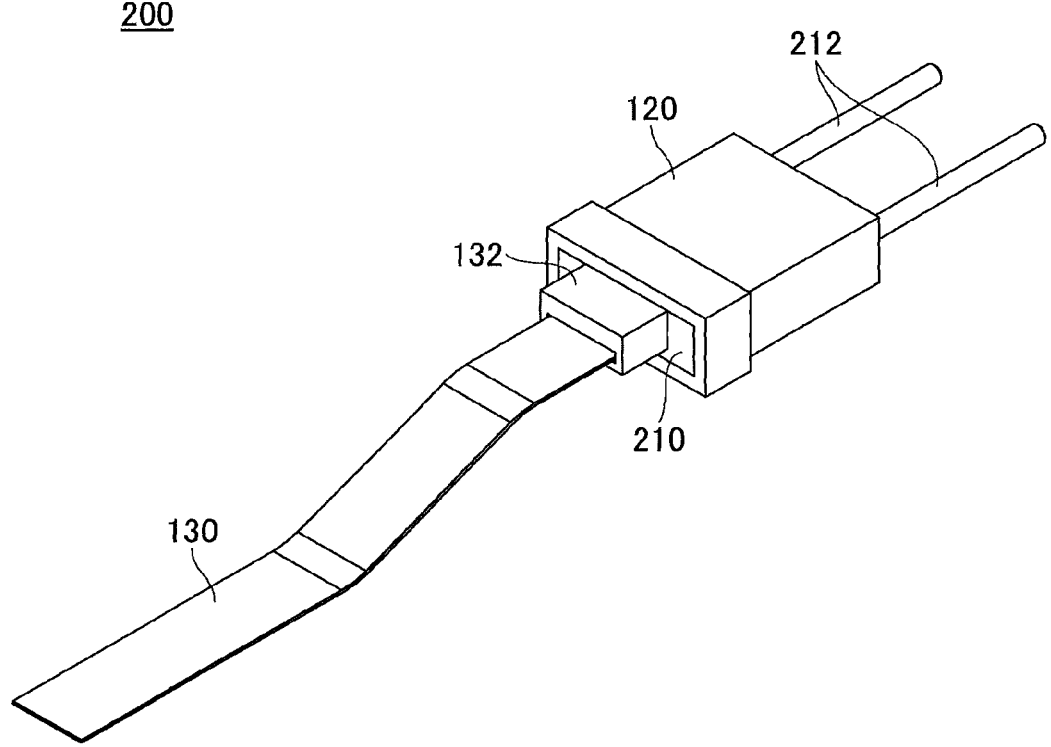
FIGS. 10A and 10B are perspective views of an optical connector according to a second embodiment.
Figure 10B:
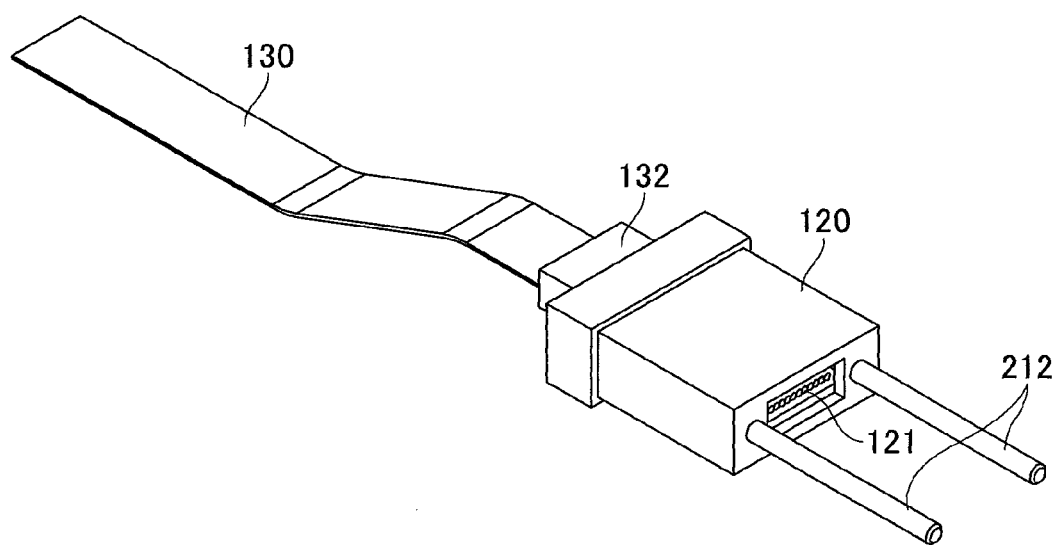
Figure 11A:
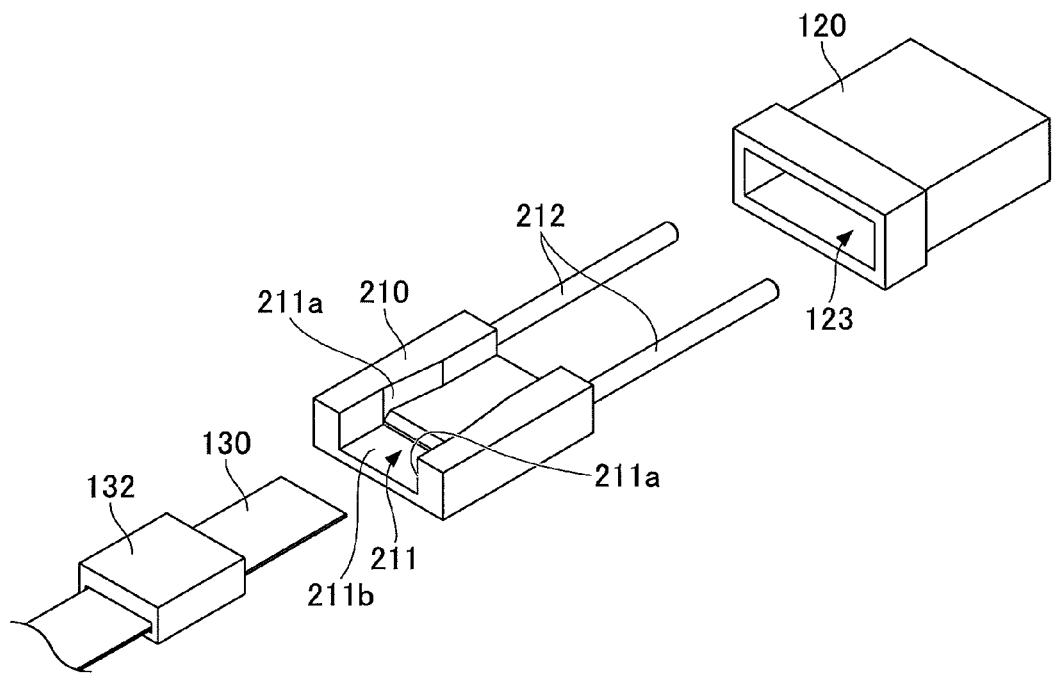
FIGS. 11A and 11B are exploded perspective views of the connector.
Figure 11B:
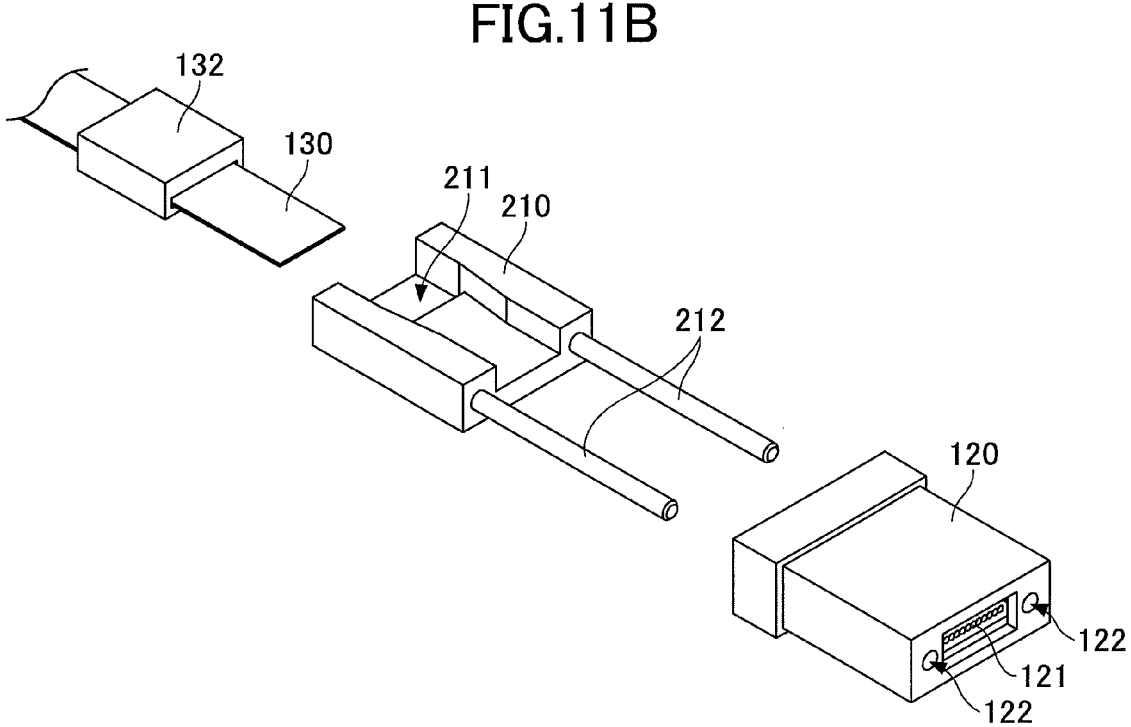
Figure 12A:
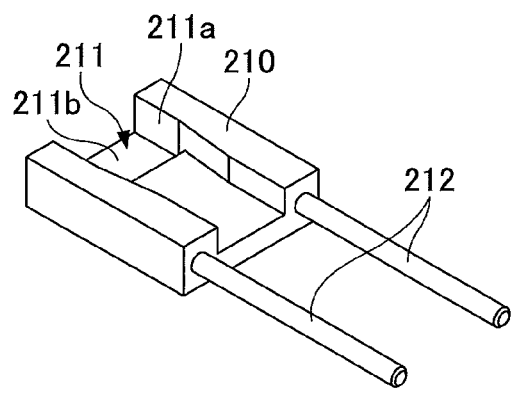
FIGS. 12A and 12B are perspective views of an attachment part according to the second embodiment.
Figure 12B:
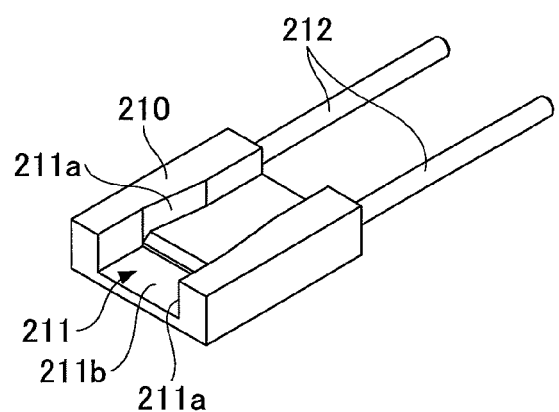
Figure 13A:
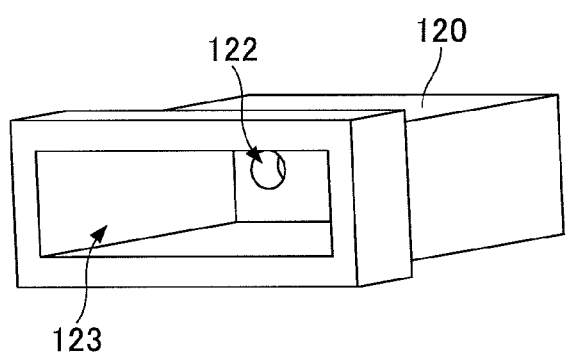
FIGS. 13A and 13B are perspective views of the lens part according to the second embodiment.
Figure 13B:
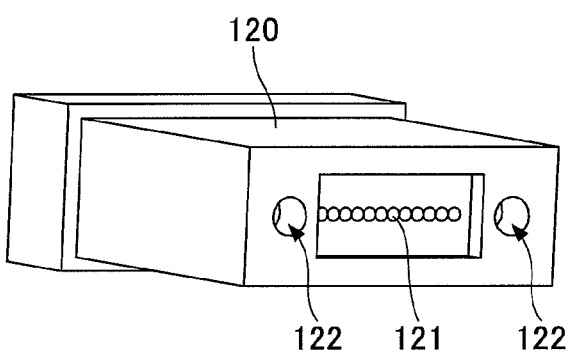

Next, a second embodiment is described with reference to FIGS. 10A through 15E. FIGS. 10A and 10B are perspective views of an optical connector 200 (hereinafter "connector 200") according to this embodiment. FIGS. 11A and 11B are exploded perspective views of the connector 200. FIGS. 12A and 12B are perspective views of an attachment part 210 according to this embodiment. FIGS. 13A and 13B are perspective views of the lens part 120. FIGS. 14 and 15A through 15E are diagrams illustrating a method of manufacturing a connector according to the second embodiment.

The connector 200 according to this embodiment includes the attachment part 210 and the lens part 120. Referring to FIGS. 11A, 11B, 13A and 13B, the lenses 121 are formed in an array in the lens part 120, and the pin holes 122 are provided across the array of the lenses 121 from each other. The pin holes 122 are formed through the lens part 120. The lens part 120 has a geometry compliant with the MT connector standard. The hole 123 for inserting the attachment part 210 is formed in the lens part 120.

Referring to FIGS. 11A, 11B, 12A and 12B, the attachment part 210 includes a groove 211 for placing the waveguide 130, and two pins 212. According to this embodiment, the groove 211 is open on one side (the upper side in FIGS. 11A and 11B). Therefore, the slit 114 formed in the attachment part 110 of the first embodiment is not formed in the attachment part 210. Furthermore, in a direction in which the waveguide 130 enters the groove 211, an interval between side wall faces 211a of the groove 211 is gradually reduced, and a bottom surface 211b of the groove 211 is stepped.

The pins 212 are inserted through the pin holes 122 of the lens part 120 and are inserted into pin holes provided in a complementary connector that is connected to the connector 200. According to this embodiment, the pins 212 and the attachment part 210 are formed of a resin material as a monolithic structure.

Figure 14:
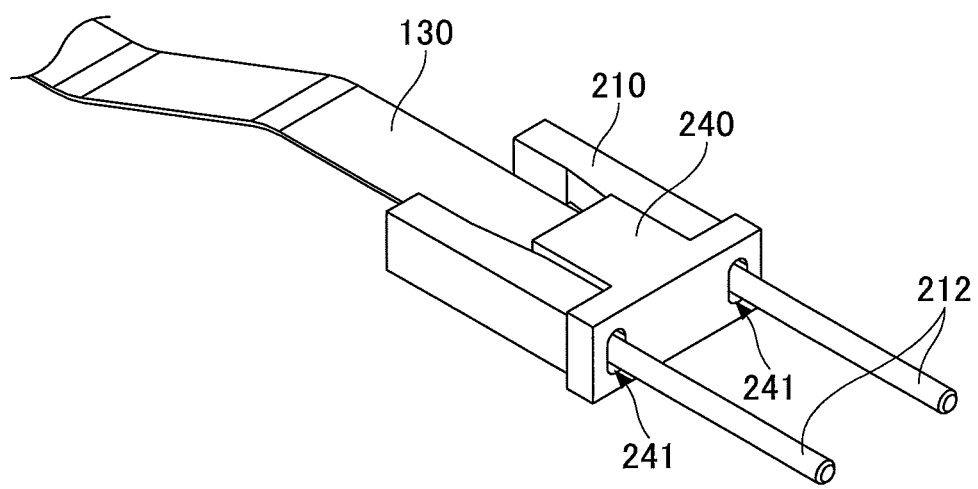
FIG. 14 is a diagram illustrating a method of manufacturing an optical connector according to the second embodiment.

The connector 200 is manufactured as follows. First, as illustrated in FIG. 14, the attachment part 210 and the waveguide 130 are aligned using a jig 240, and thereafter, the attachment part 210 and the waveguide 130 are bonded using, for example, an adhesive agent. Through holes 241 for inserting the pins 212 are formed in the jig 240. The through holes 241 are vertically elongated to allow vertical movement of the jig 240 relative to the attachment part 210.

Figure 15A:
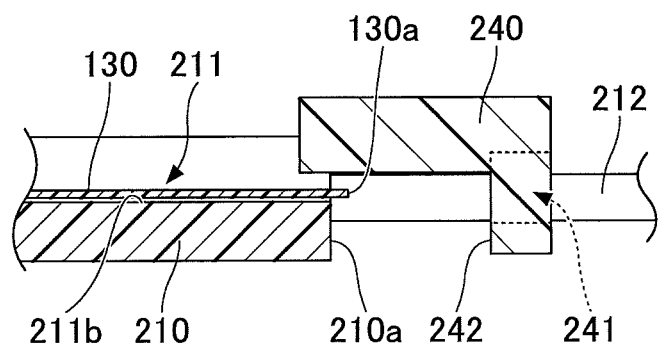
FIGS. 15A through 15E are diagrams illustrating the method of manufacturing an optical connector according to the second embodiment.

Specifically, as illustrated in FIG. 15A, an end 210a of the attachment part 210 and an end portion 130a of the waveguide 130 are brought close to an alignment surface 242 of the jig 240 with the pins 212 being inserted through the through holes 241 and the waveguide 130 being placed in the groove 211. In the state illustrated in FIG. 15A, there is a gap between the waveguide 130 and the bottom surface 211b of the groove 211, and the end portion 130a of the waveguide 130 projects toward the alignment surface 242 relative to the end 210a of the attachment part 210.

Figure 15B:
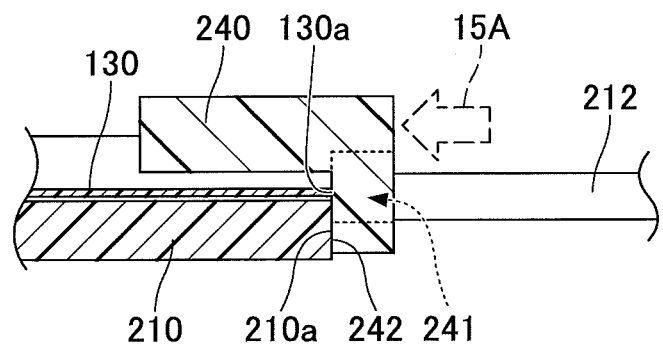

Next, as illustrated in FIG. 15B, the jig 240 is moved in a direction indicated by a broken-line arrow 15A to cause the end 210a of the attachment part 210 and the end portion 130a of the waveguide 130 to come into contact with the alignment surface 242 of the jig 240, so that the end of the waveguide 130 and the end 210a of the attachment part 210 are aligned.

Figure 15C:
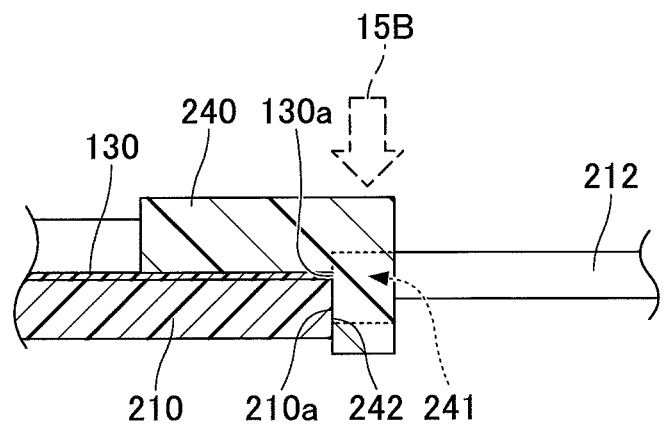

Next, as illustrated in FIG. 15C, the waveguide 130 is pressed from above as indicated by a broken-line arrow 15B toward the attachment part 210 to eliminate the gap between the waveguide 130 and the attachment part 210, so that the waveguide 130 and the attachment part 210 are vertically aligned. Then, the attachment part 210 and the waveguide 130 are bonded with an adhesive. The adhesive may be applied either in the state illustrated in FIG. 15A or in the state illustrated in FIG. 15B. Thereafter, the jig 240 is removed from the pins 212 of the attachment part 210.

Figure 15D:
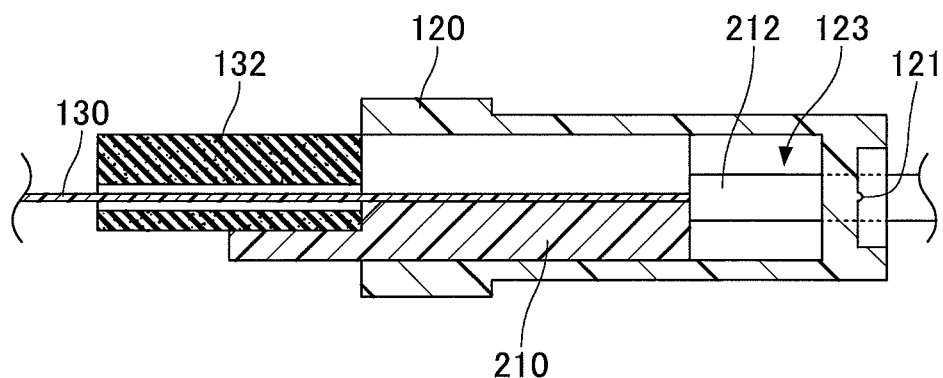
Figure 15E:
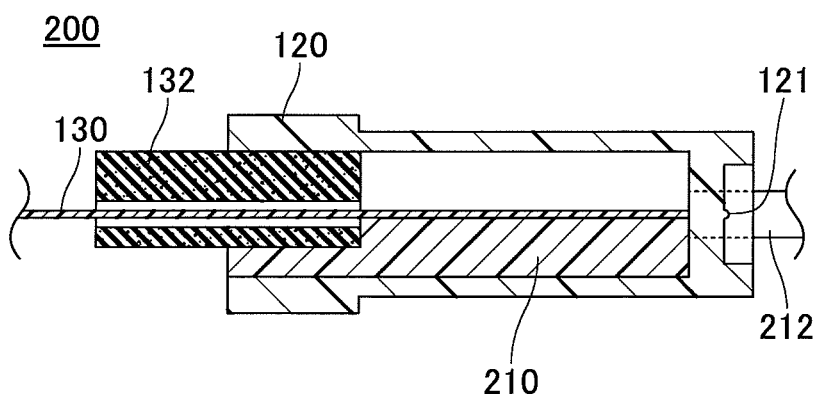

Thereafter, as illustrated in FIG. 15D, the attachment part 210 to which the waveguide 130 is bonded is inserted into the hole 123 of the lens part 120, the pins 212 are inserted through the pin holes 122 provided in the lens part 120. As illustrated in FIG. 15E, the lens part 120 and the attachment part 210 are bonded with the attachment part 210 being completely inserted in the hole 123. The boot 132 is attached to the attachment part 210 so that an end of the boot 132 comes into contact with a step formed on the bottom surface 211b of the groove 211.

According to this embodiment, the attachment part 210 is formed of a resin material that is susceptible of little cure shrinkage. Therefore, the pins 212 and the groove 211 are at desired positions relative to each other. As a result, the attachment part 210 and the lens part 120 are positioned relative to each other by the pins 212 and the pin holes 122, so that it is possible to join the lens part 120 and the attachment part 210 so that the cores 131 and the lenses 121 are in a desired positional relationship.

In order to properly align the cores 131 and the lenses 121, the groove 211 is required to be formed at an appropriate position relative to the pins 212, and an end opening of the groove 211 is required to be formed with good position and size accuracy. According to this embodiment, the groove 211 formed in the attachment part 210 is open on the upper side. Therefore, there is no need to form a through hole inside the attachment part 210. Accordingly, it is possible to form the attachment part 210 relatively easily with high accuracy.

Furthermore, by using the jig 240 to attach the waveguide 130 to the attachment part 210, it is possible to align the waveguide 130 with the attachment part 210 vertically and laterally.

In respects other than those described above, the second embodiment may be equal to the first embodiment.

[c] Third Embodiment

Figure 16A:
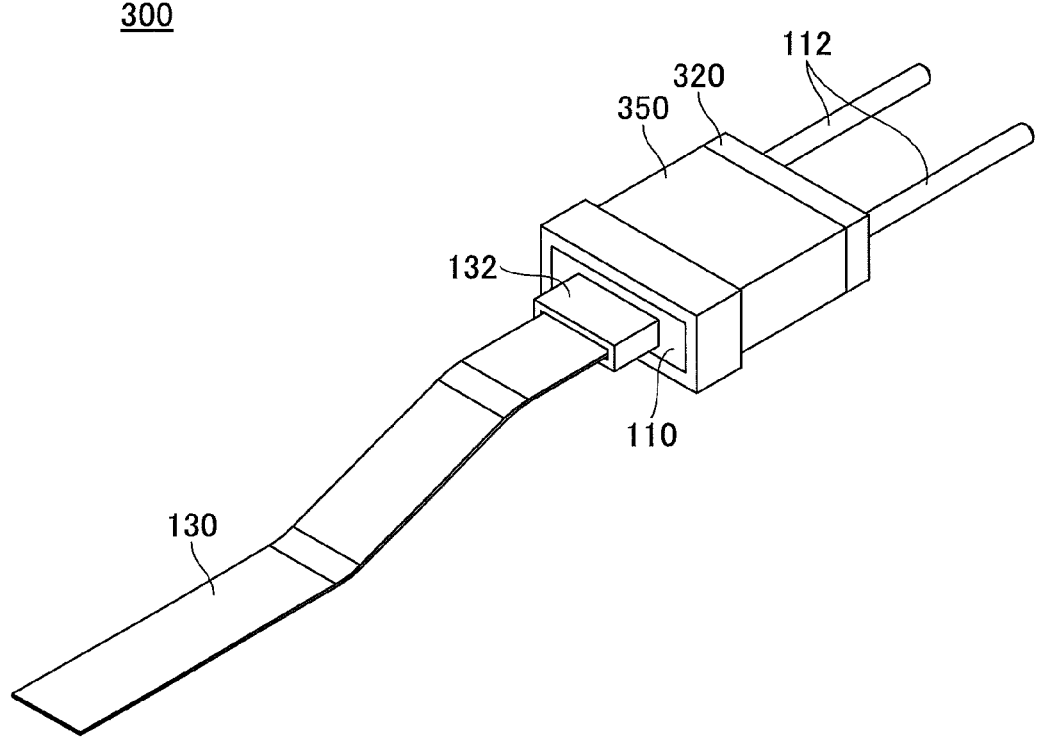
FIGS. 16A and 16B are perspective views of an optical connector according to a third embodiment.
Figure 16B:
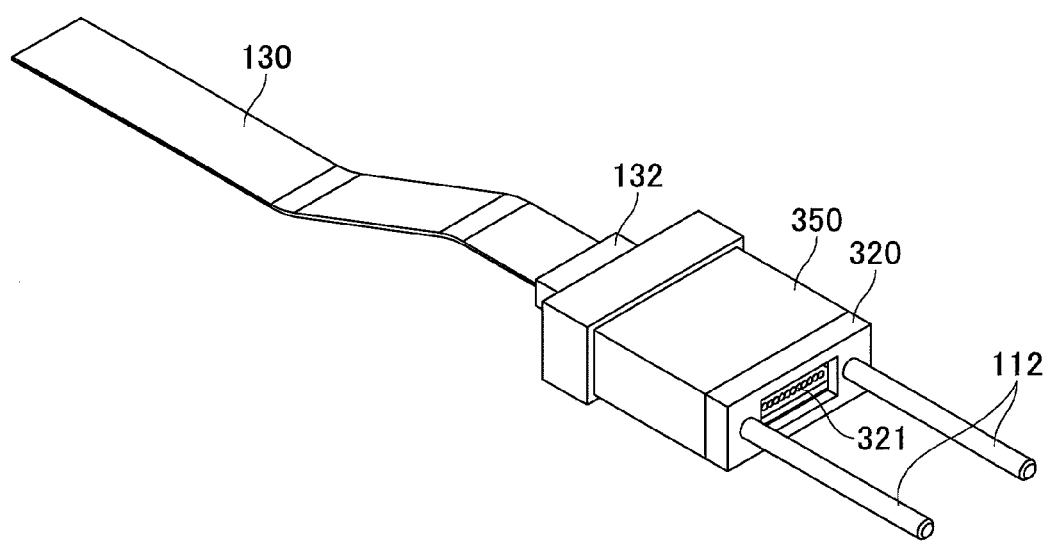
Figure 17A:
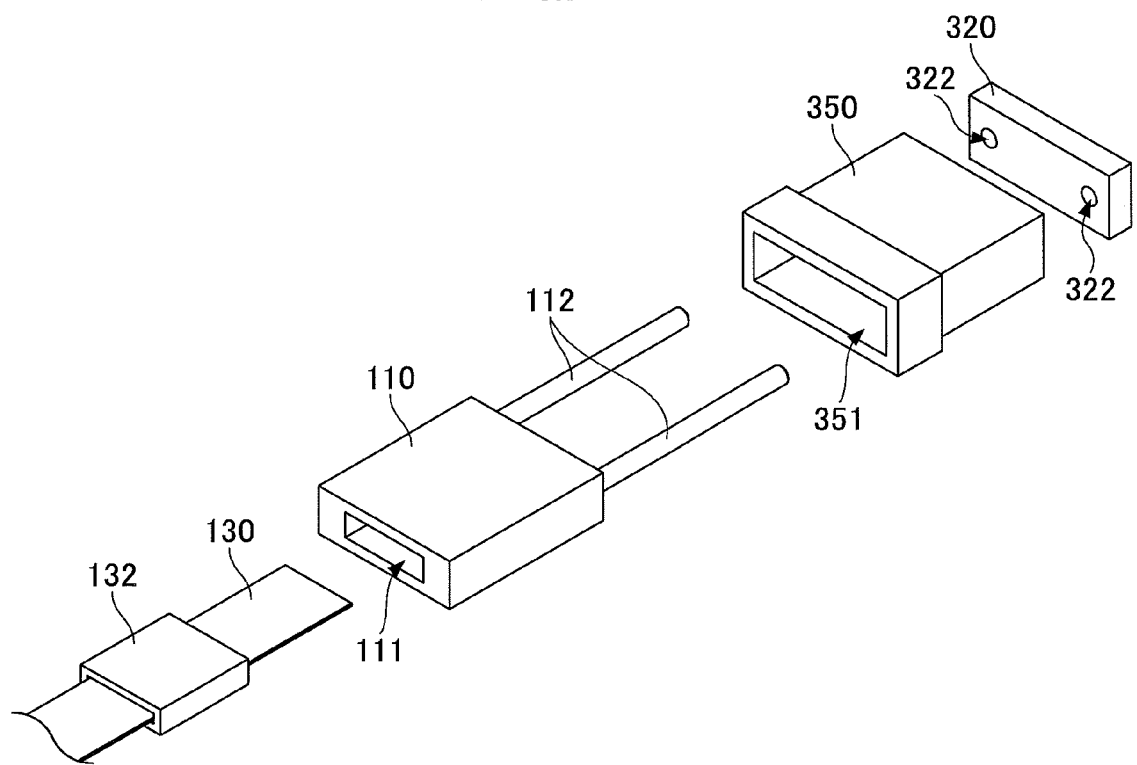
FIGS. 17A and 17B are exploded perspective views of the optical connector according to the third embodiment.
Figure 17B:
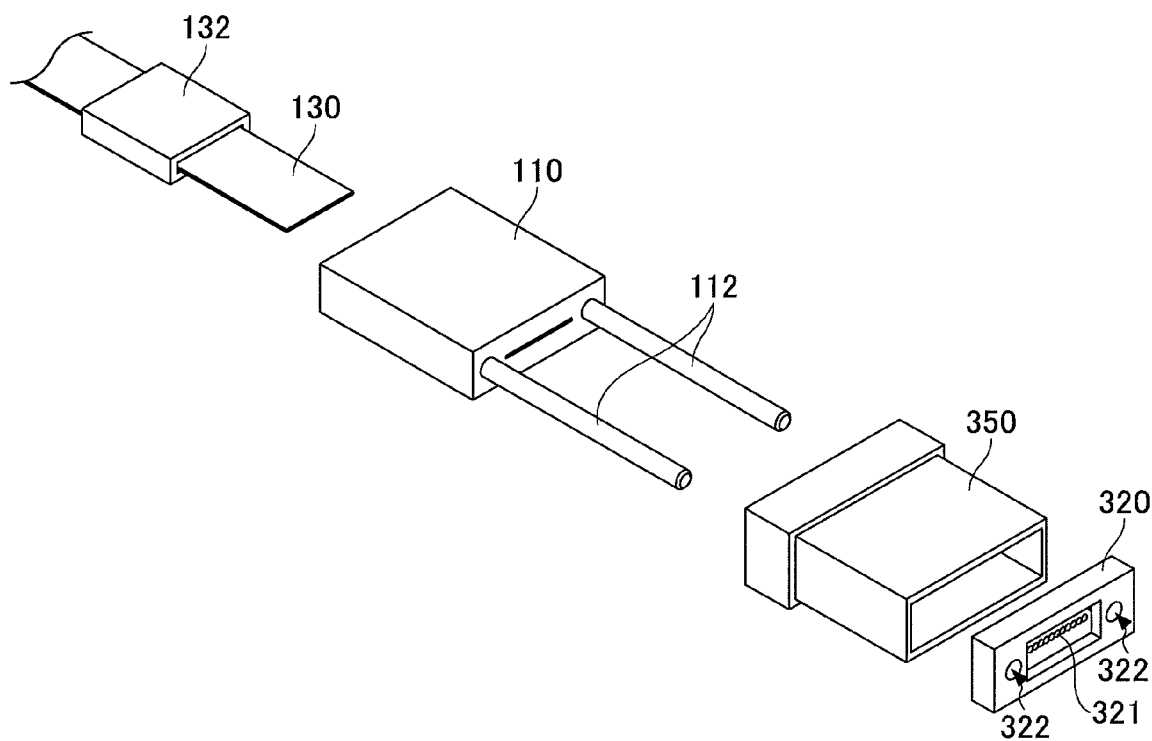
Figure 18A:
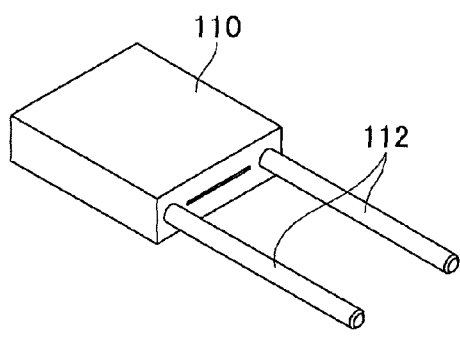
FIGS. 18A and 18B are perspective views of the attachment part according to the third embodiment.
Figure 18B:
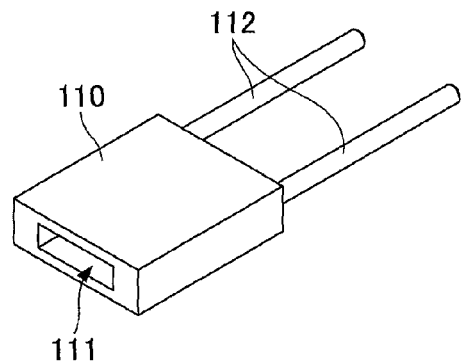
Figure 19A:
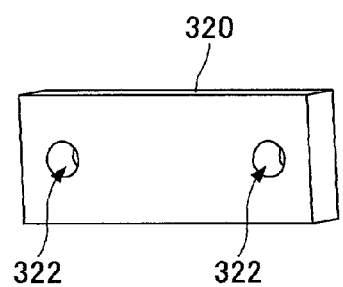
FIGS. 19A and 19B are perspective views of a lens part according to the third embodiment.
Figure 19B:
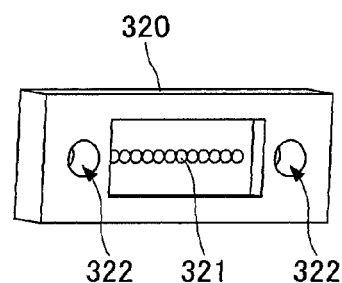
Figure 20:
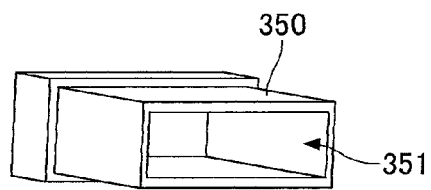
FIG. 20 is a perspective view of a cover according to the third embodiment.
Figure 21A:
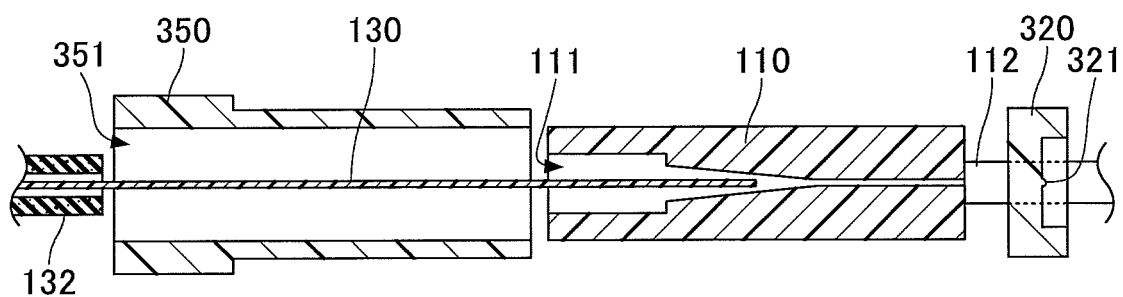
FIGS. 21A and 21B are diagrams illustrating a method of manufacturing an optical connector according to the third embodiment.
Figure 21B:
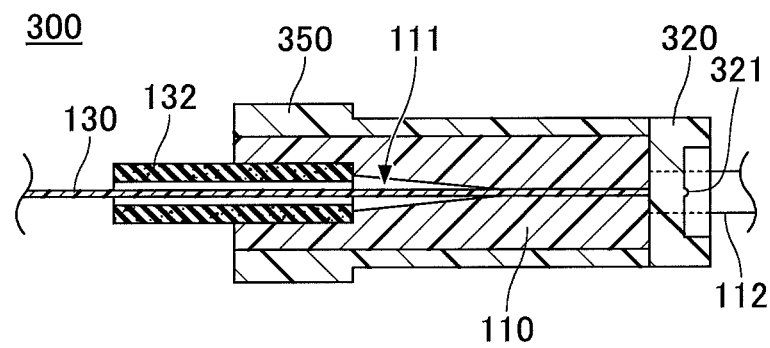

Next, a third embodiment is described with reference to FIGS. 16A through 21B. FIGS. 16A and 16B are perspective views of an optical connector 300 (hereinafter "connector 300") according to this embodiment. FIGS. 17A and 17B are exploded perspective views of the connector 300. FIGS. 18A and 18B are perspective views of the attachment part 110. FIGS. 19A and 19B are perspective views of a lens part 320 according to this embodiment. FIG. 20 is a perspective view of a cover 350 according to this embodiment. FIGS. 21A and 21B are diagrams illustrating a method of manufacturing the connector.

The connector 300 according to this embodiment includes the attachment part 110, the lens part 320, and the cover 350. The lens part 320 and the cover 350 are provided as separate bodies. When the connector 300 is assembled, the lens part 320 is attached to an end portion of the cover 350.

The lens part 320 is formed of COP. Lenses 321 are formed in an array in the lens part 320, and pin holes 322 penetrating through the lens part 320 are provided across the array of the lenses 321 from each other. As the lens part 320 is formed separately from the cover 350, the lens part 320 may have a substantially flat plate shape as illustrated in FIGS. 19A and 19B. Accordingly, compared with the case of forming a groove in a lens part, it is possible to form the lens part 320 easily with high accuracy.

The cover 350 has a geometry compliant with the MT connector standard. A through hole 351 for inserting the attachment part 110 is formed in the cover 350. It is possible to form the cover 350 relatively easily as well.

The attachment part 110 includes the groove 111 and the two pins 112. The pins 112 are inserted through the pin holes 322 and are inserted into pin holes provided in a complementary connector that is connected to the connector 300.

The connector 300 is manufactured as follows. First, as illustrated in FIG. 21A, the attachment part 110 is inserted into the through hole 351 with the pins 112 being inserted through the pin holes 322 and the waveguide 130 being inserted into the groove 111. Then, as illustrated in FIG. 21B, the lens part 320 and the attachment part 110 are fixed, the attachment part 110 and the waveguide 130 are fixed, and the cover 350 and the attachment part 110 are fixed.

By inserting the pins 112 through the pin holes 322, it is possible to position the lens part 320 and the attachment part 110 relative to each other.

The waveguide 130 may be inserted into the groove 111 either before or after inserting the pins 112 through the pin holes 322.

In respects other than those described above, the third embodiment may be equal to the first embodiment.

[d] Fourth Embodiment

Figure 22A:
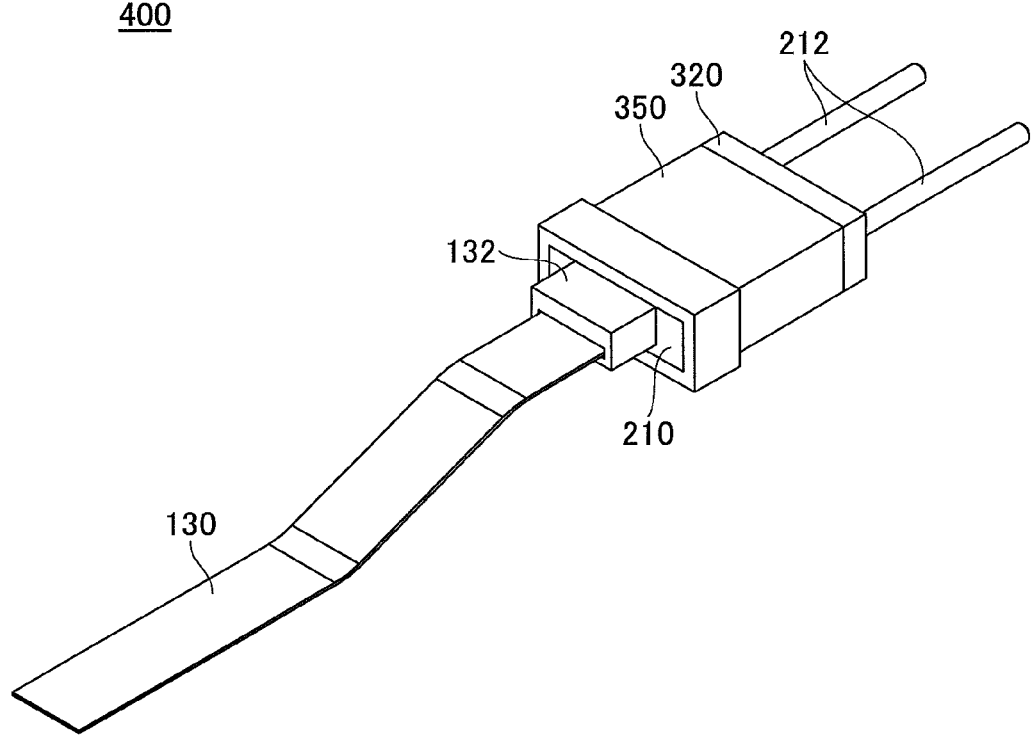
FIGS. 22A and 22B are perspective views of an optical connector according to a fourth embodiment.
Figure 22B:
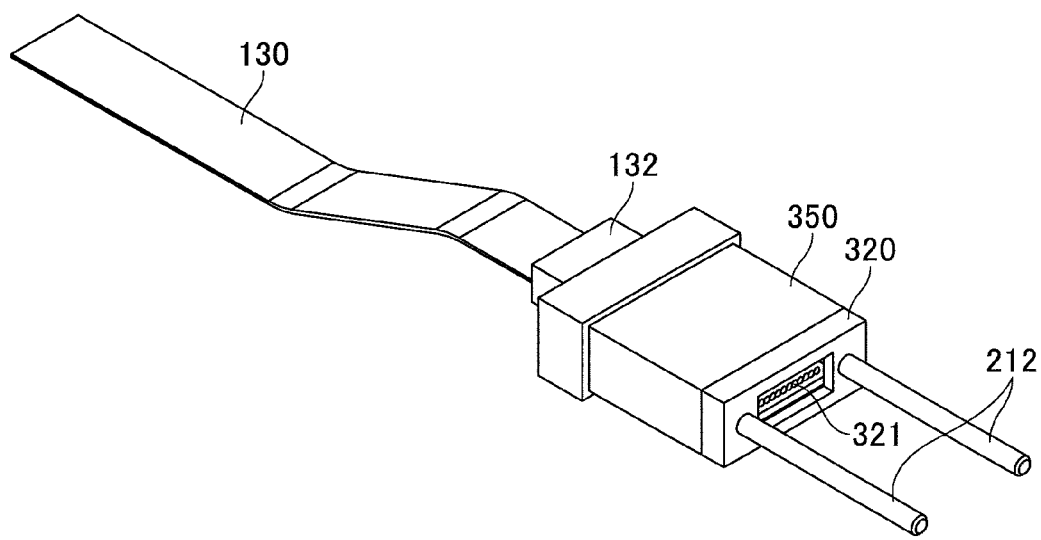
Figure 23A:
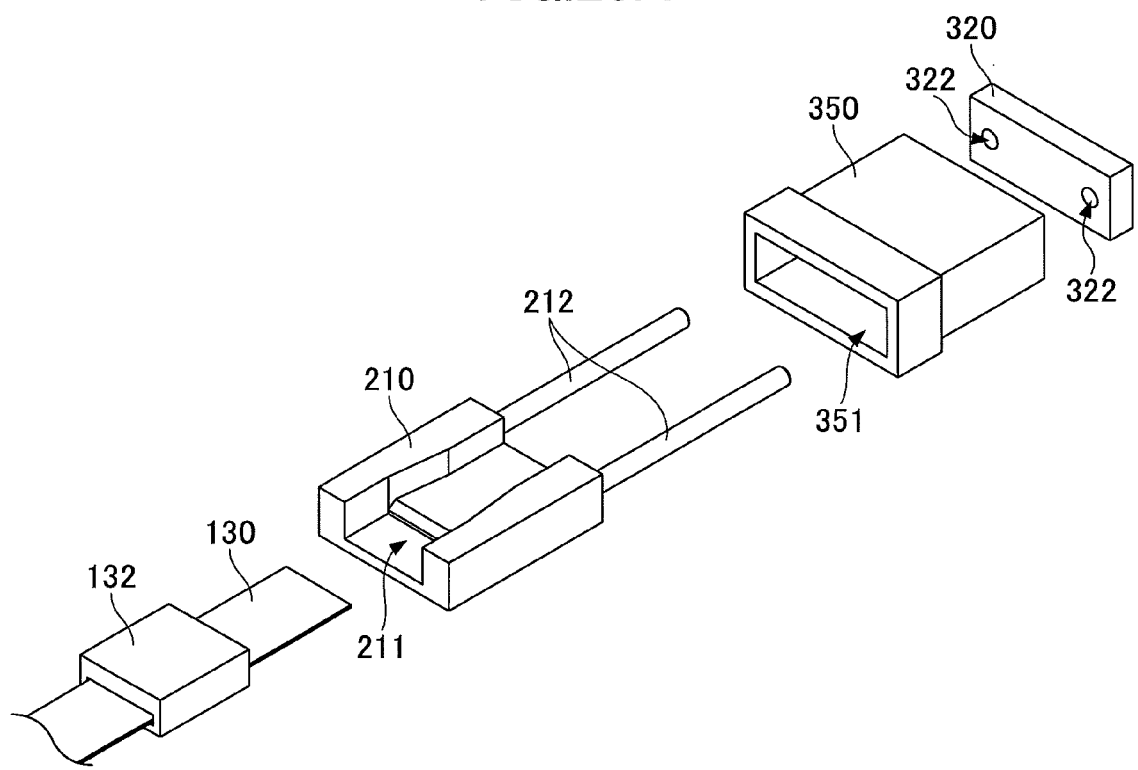
FIGS. 23A and 23B are exploded perspective views of the optical connector according to the fourth embodiment.
Figure 23B:
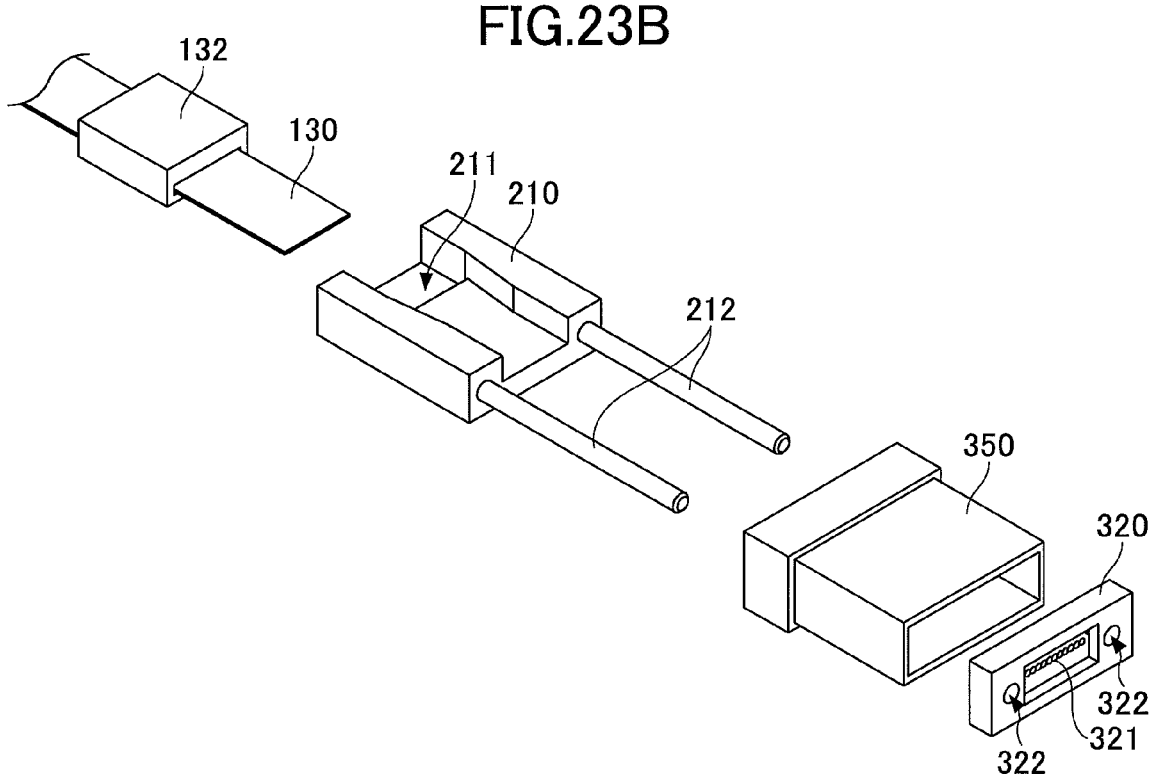
Figure 24A:
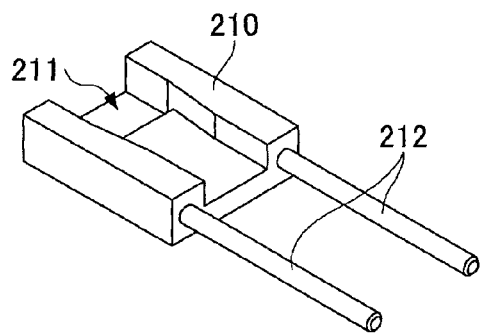
FIGS. 24A and 24B are perspective views of the attachment part according to the fourth embodiment.
Figure 24B:
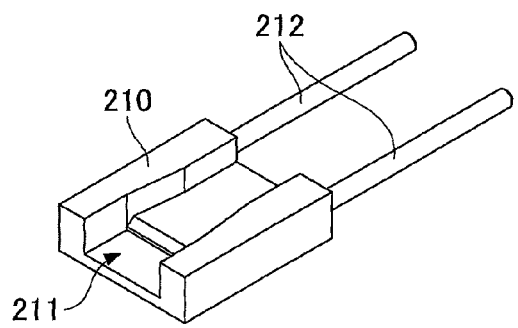
Figure 25A:
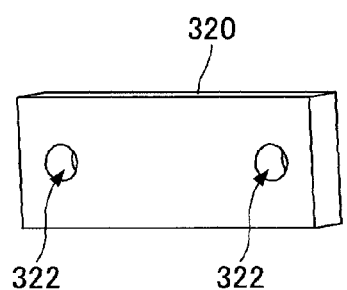
FIGS. 25A and 25B are perspective views of the lens part according to the fourth embodiment.
Figure 25B:
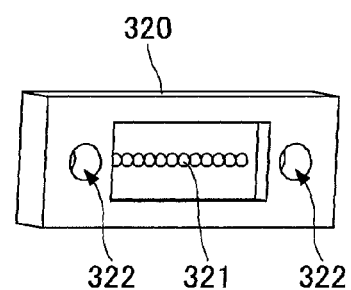
Figure 26:
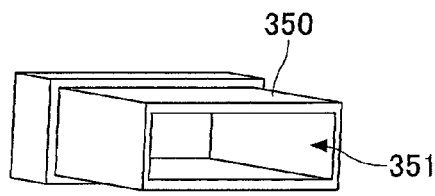
FIG. 26 is a perspective view of the cover according to the fourth embodiment.
Figure 27A:
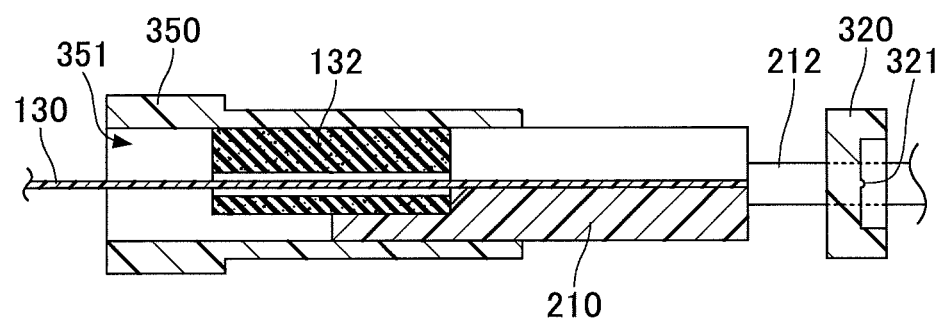
FIGS. 27A and 27B are diagrams illustrating a method of manufacturing an optical connector according to the fourth embodiment.
Figure 27B:
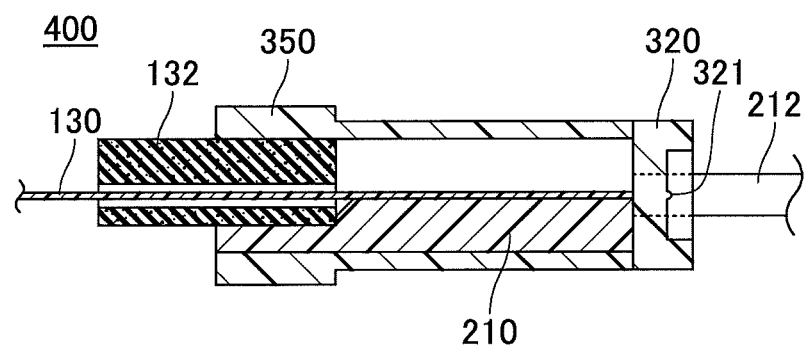

Next, a fourth embodiment is described with reference to FIGS. 22A through 27B. FIGS. 22A and 22B are perspective views of an optical connector 400 (hereinafter "connector 400") according to this embodiment. FIGS. 23A and 23B are exploded perspective views of the connector 400. FIGS. 24A and 24B are perspective views of the attachment part 210. FIGS. 25A and 25B are perspective views of the lens part 320. FIG. 26 is a perspective view of the cover 350. FIGS. 27A and 27B are diagrams illustrating a method of manufacturing the connector.

As with the connector 300 of the third embodiment, the lens part 320 and the cover 350 are provided as separate bodies. The lens part 320 is attached to an end portion of the cover 350. The pin holes 322 penetrating the lens part 320 are provided across the array of the lenses 321 from each other. As the lens part 320 is formed separately from the cover 350, the lens part 320 may have a substantially flat plate shape as illustrated in FIGS. 25A and 25B.

The cover 350 has a geometry compliant with the MT connector standard. The through hole 351 is formed in the cover 350.

The attachment part 210 includes the groove 211 for placing the waveguide 130, and the two pins 212. The groove 211 is open on one side in the attachment part 210. The pins 212 are inserted through the pin holes 322 and into pin holes provided in a complementary connector that is connected to the connector 400.

The connector 400 is manufactured as follows. The attachment part 210 and the waveguide 130 are aligned using the jig 240 illustrated in FIG. 14 and are thereafter bonded with each other as illustrated in FIGS. 15A through 15C.

Thereafter, as illustrated in FIG. 27A, the attachment part 210 to which the waveguide 130 is attached is inserted into the through hole 351, and the pins 212 are inserted through the pin holes 322. Then, as illustrated in FIG. 27B, with the attachment part 210 and the lens part 320 being in contact, the lens part 320 and the attachment part 210 are bonded.

In respects other than those described above, the fourth embodiment may be equal to the second embodiment.

[e] Fifth Embodiment

Next, a fifth embodiment is described. An optical connector according to this embodiment includes an optical waveguide guide (hereinafter "guide") that supports a waveguide. The guide fixes the position of and protects the waveguide connected to an attachment part. Thus, according to this embodiment, the waveguide 130 does not have to be provided with the boot 132. The guide according to this embodiment may be applied to any of the connectors 100, 200, 300 and 400 of the first through fourth embodiment and the connector 20.

Figure 28:
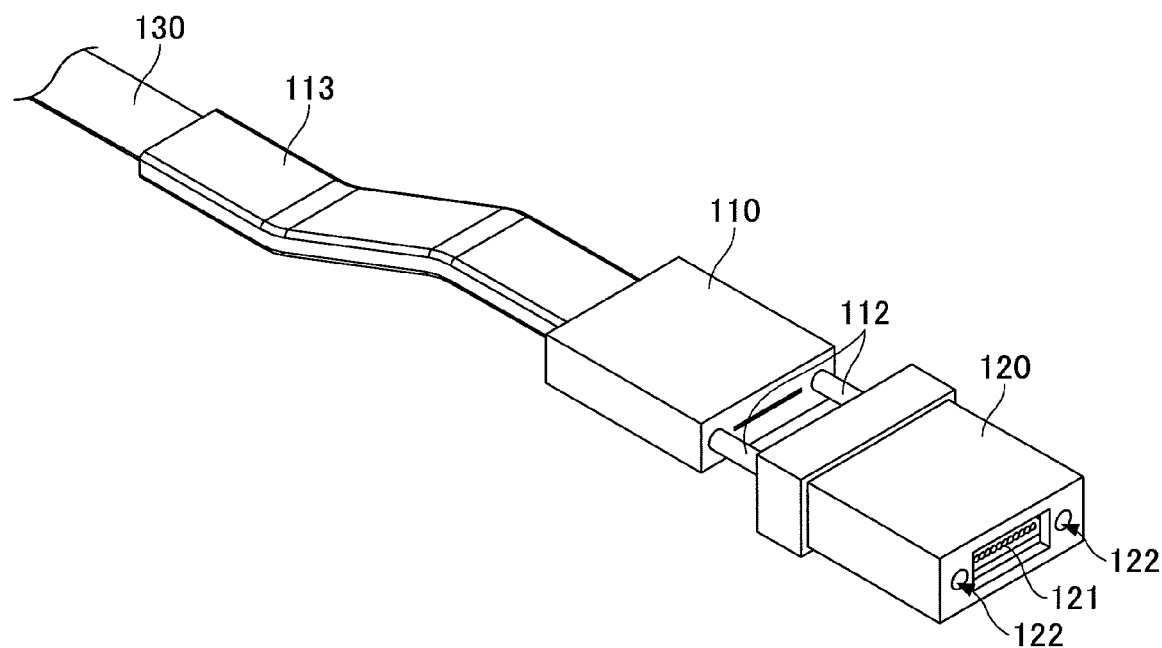
FIG. 28 is an exploded perspective view of an optical connector according to a fifth embodiment.
Figure 29:
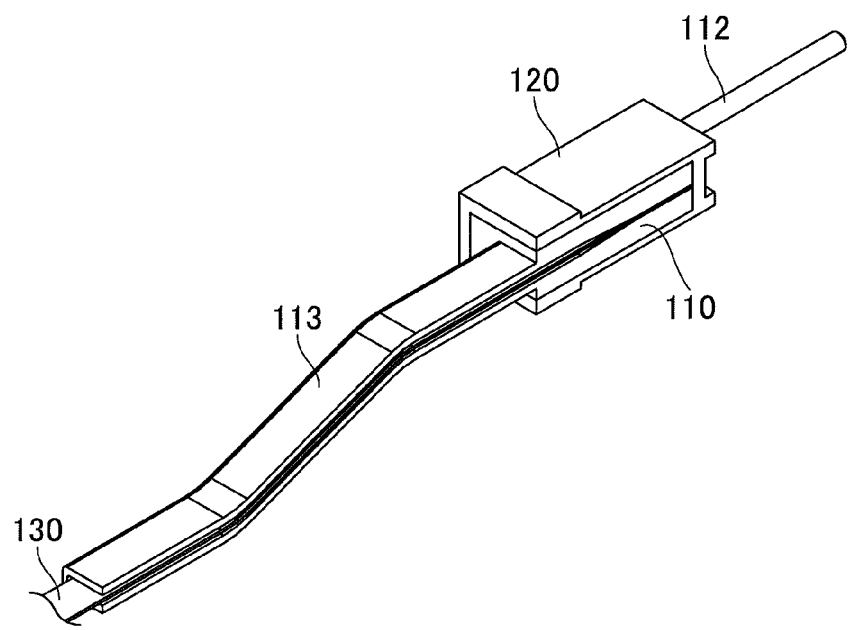
FIG. 29 is a perspective cross-sectional view of the optical connector of FIG. 28.

FIG. 28 is a partly-exploded perspective view of a connector according to this embodiment. FIG. 29 is a perspective cross-sectional view of the connector of FIG. 28, taken along the longitudinal direction of the waveguide 130.

Figure 30:
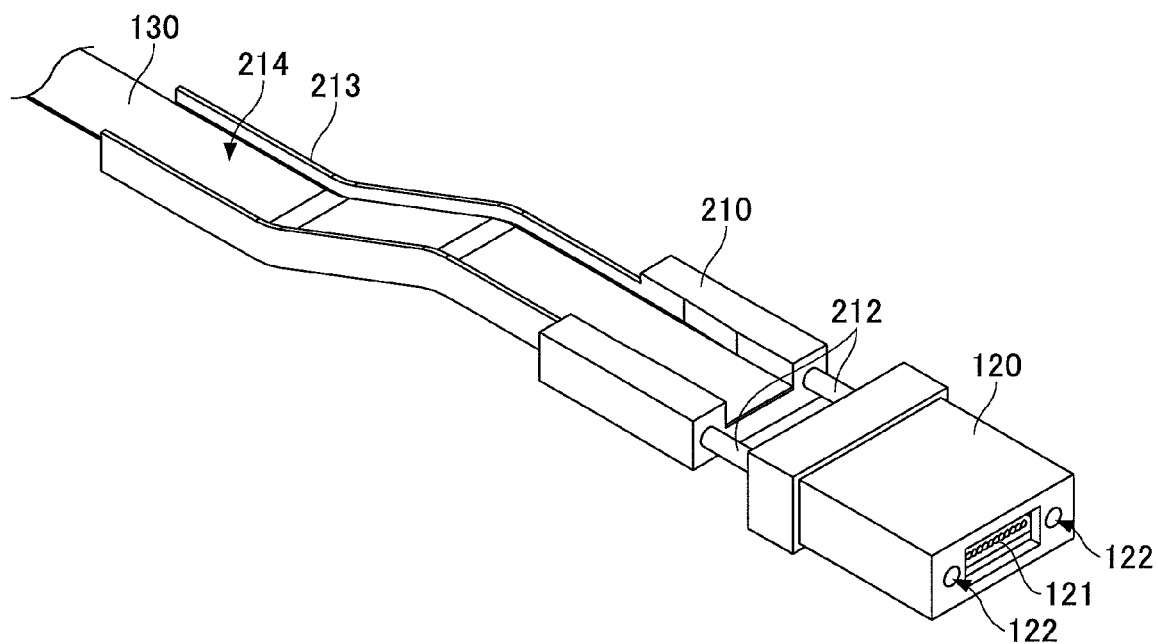
FIG. 30 is an exploded perspective view of another optical connector according to the fifth embodiment.

In FIGS. 29 and 30, a guide 113 is monolithically formed with the attachment part 110 of the first embodiment, and the waveguide 130 is inserted into a groove formed in the guide 113. As a result, it is possible to protect the waveguide 130 and fix the waveguide 130 in a desired shape with the guide 113. The attachment part 110 and the guide 113 are formed of a resin material. The guide 113 is formed with a curve gentler than the bending limit of the waveguide 130.

Figure 31:
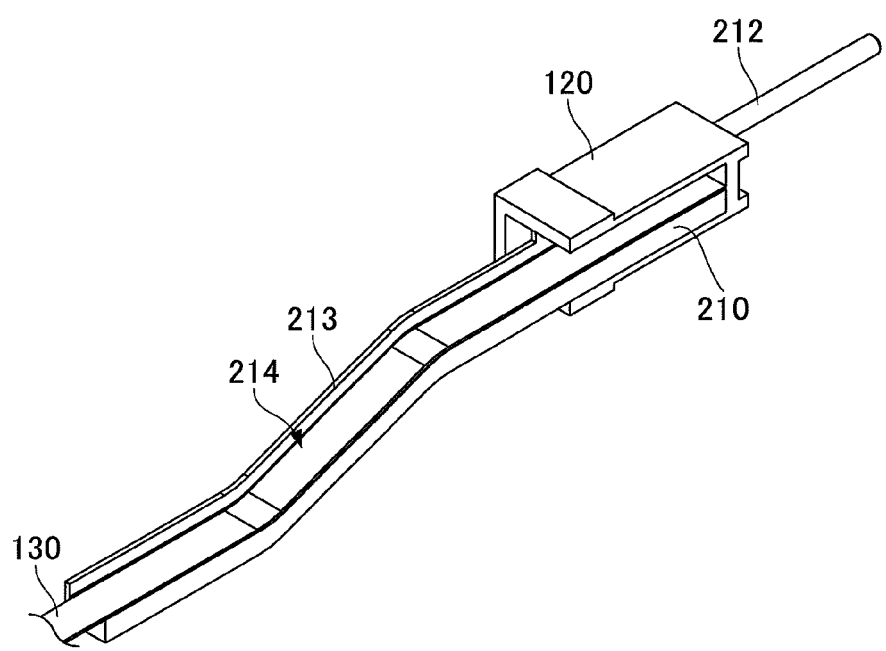
FIG. 31 is a perspective cross-sectional view of the optical connector of FIG. 30.

FIG. 30 is a partly-exploded perspective view of another connector according to this embodiment. FIG. 31 is a perspective cross-sectional view of the connector of FIG. 30, taken along a longitudinal direction of the waveguide 130.

In FIGS. 30 and 31, a guide 213 is monolithically formed with the optical waveguide attachment part 210 of the second embodiment, and the waveguide 130 is placed in a groove 214. As a result, it is possible to protect the waveguide 130 and fix the waveguide 130 in a desired shape with the guide 213. The attachment part 210 and the guide 213 are monolithically formed of a resin material.

While a through hole is formed in the guide 113 of FIG. 28, the guide 213 of FIG. 30 is open on the upper side. Therefore, the waveguide 130 is fixed to a bottom surface of the guide 213.

Figure 32:
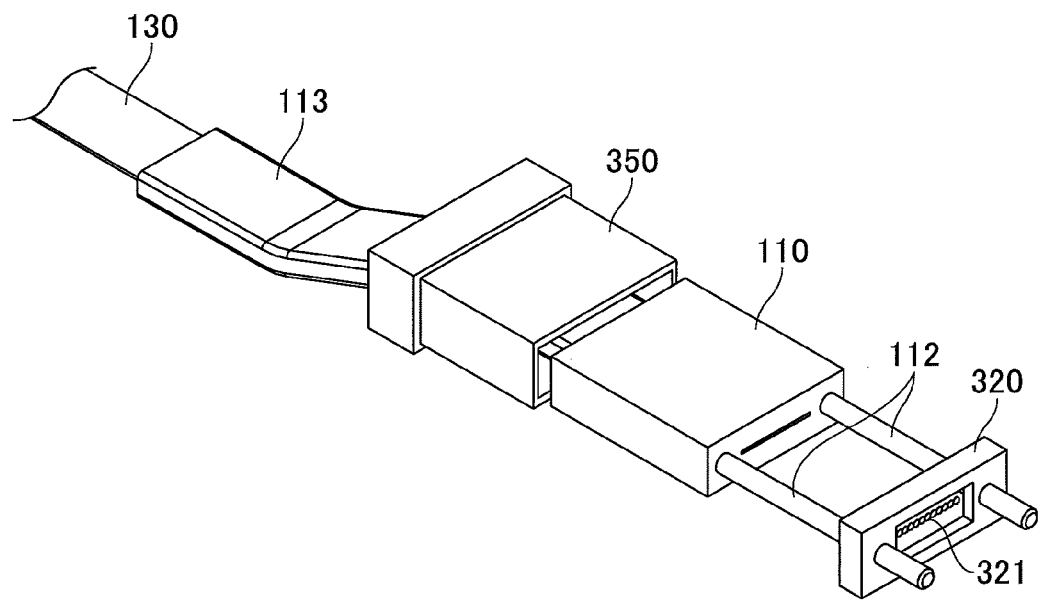
FIG. 32 is an exploded perspective view of yet another optical connector according to the fifth embodiment.
Figure 33:
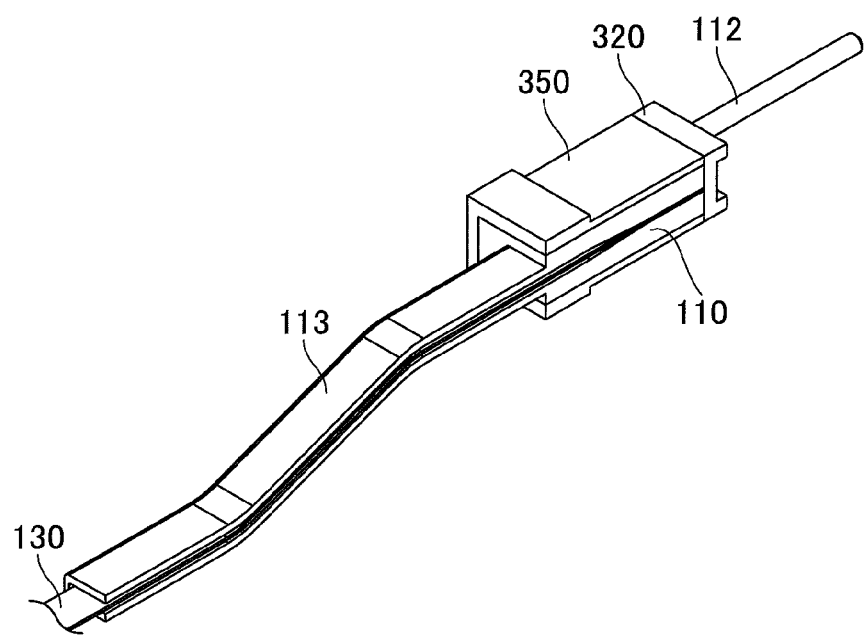
FIG. 33 is a perspective cross-sectional view of the optical connector of FIG. 32.

FIG. 32 is a partly-exploded perspective view of yet another connector according to this embodiment. FIG. 33 is a perspective cross-sectional view of the connector of FIG. 32, taken along a longitudinal direction of the waveguide 130. In FIGS. 32 and 33, the attachment part 110 of the third embodiment is provided with the guide 113, and the waveguide 130 is inserted into a groove (through hole) formed in the guide 113.

Figure 34:
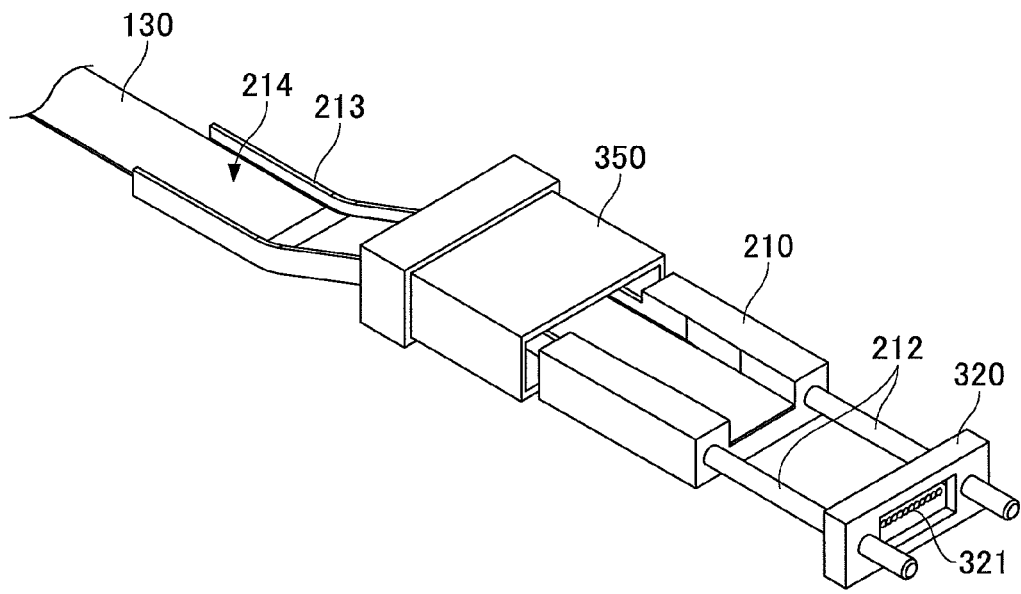
FIG. 34 is an exploded perspective view of still another optical connector according to the fifth embodiment.
Figure 35:
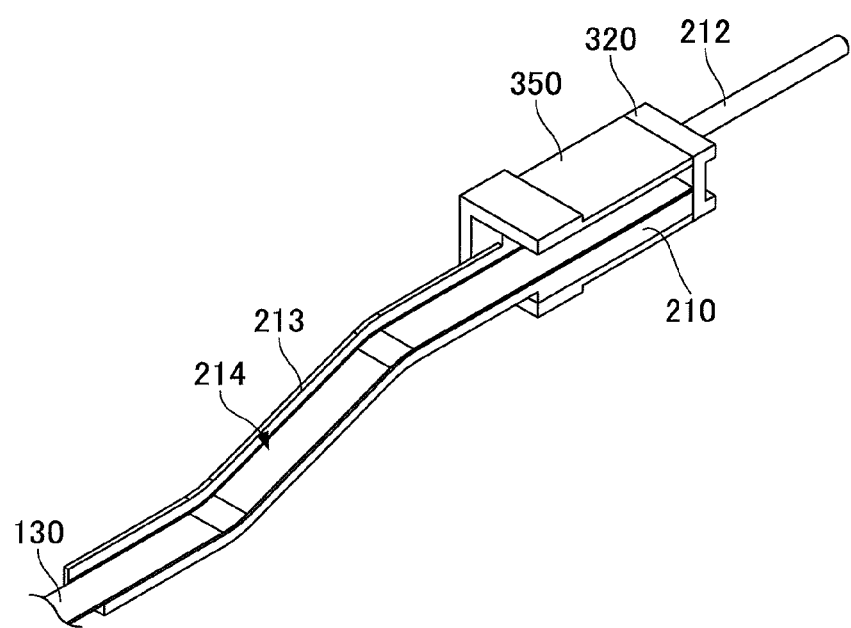
FIG. 35 is a perspective cross-sectional view of the optical connector of FIG. 34.

FIG. 34 is a partly-exploded perspective view of still another connector according to this embodiment. FIG. 35 is a perspective cross-sectional view of the connector of FIG. 34, taken along a longitudinal direction of the waveguide 130. In FIGS. 34 and 35, the attachment part 210 of the fourth embodiment is provided with the guide 213, and the waveguide 130 is placed in the groove 214 of the guide 213.

[f] Sixth Embodiment

Figure 36A:
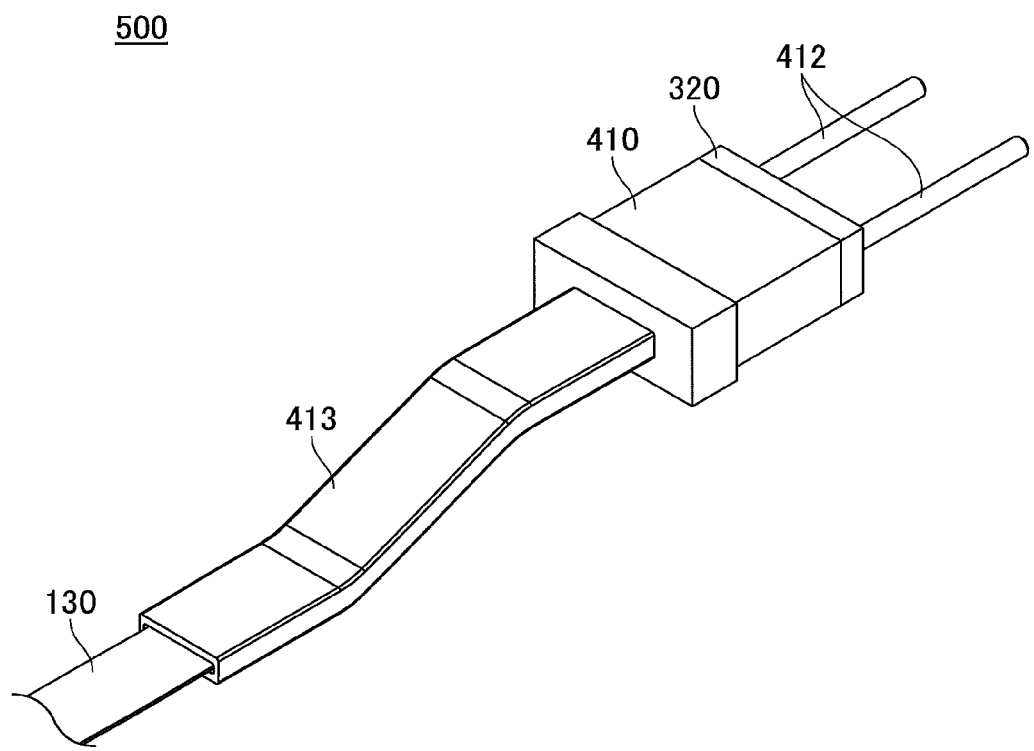
FIGS. 36A and 36B are perspective views of an optical connector according to a sixth embodiment.
Figure 36B:
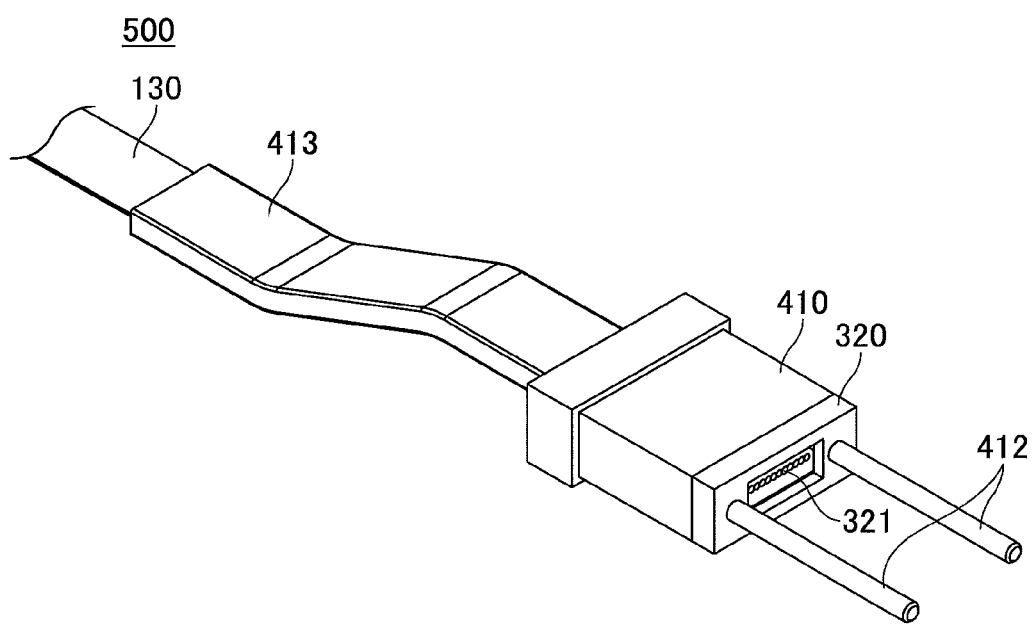
Figure 37A:
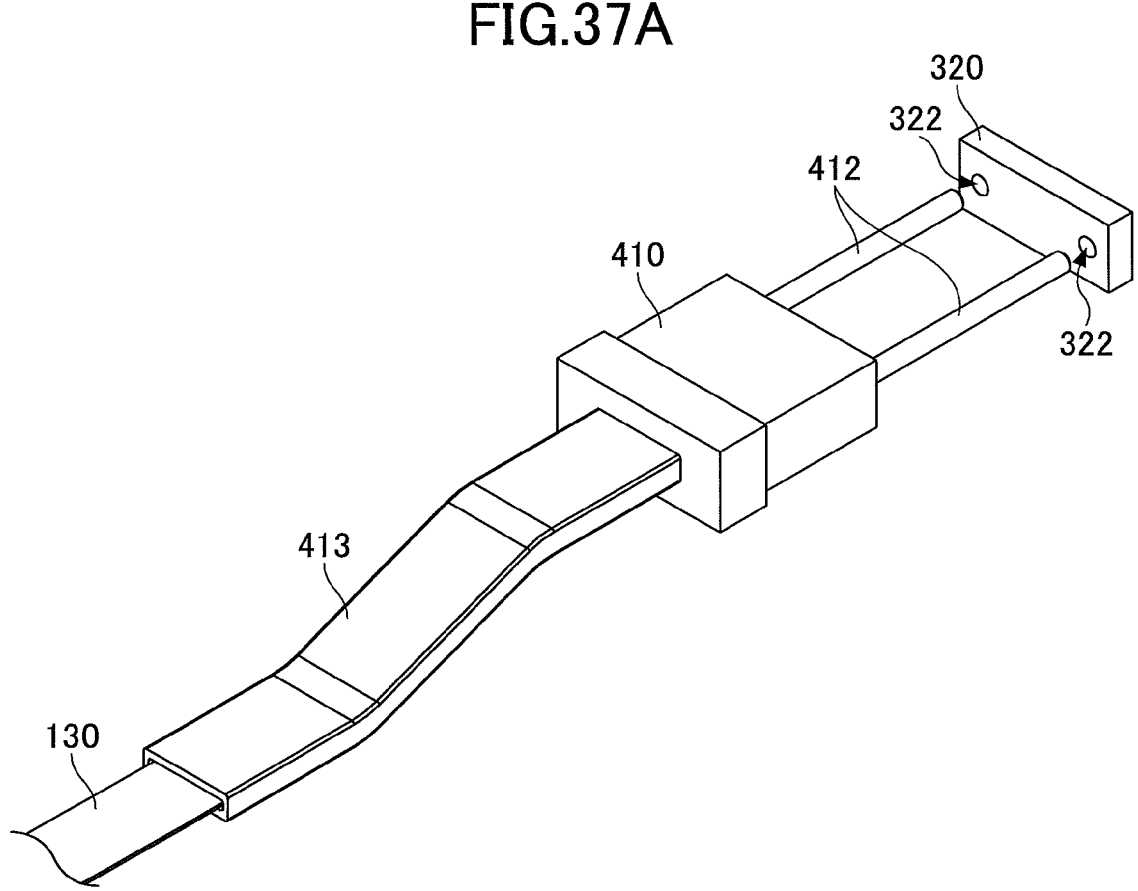
FIGS. 37A and 37B are exploded perspective views of the optical connector according to the sixth embodiment.
Figure 37B:
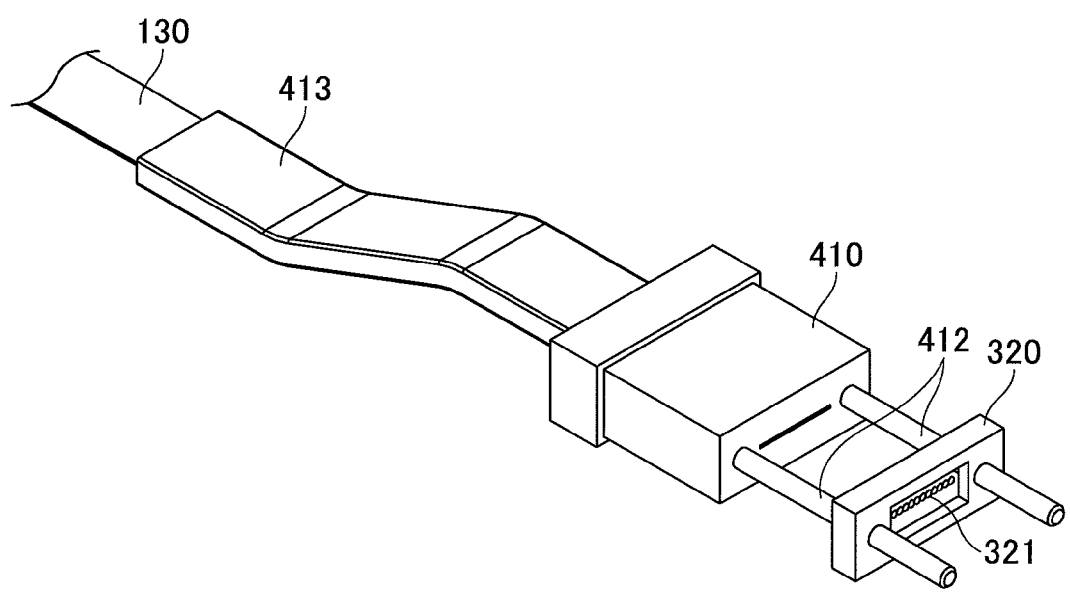
Figure 38A:
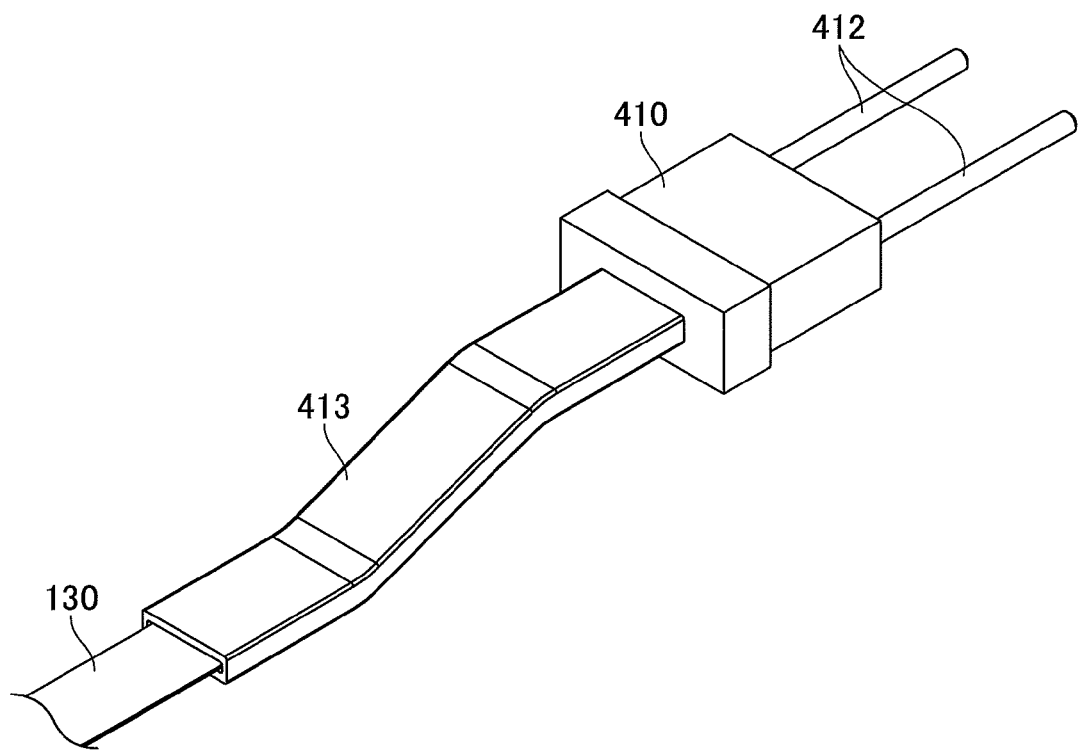
FIGS. 38A and 38B are perspective views of an attachment part according to the sixth embodiment.
Figure 38B:
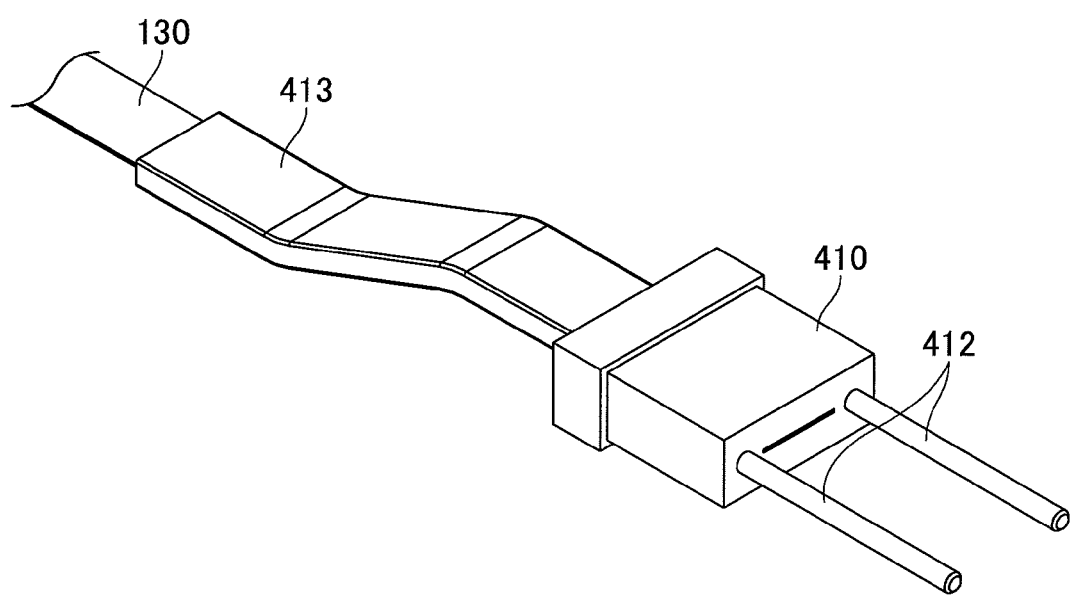
Figure 39A:
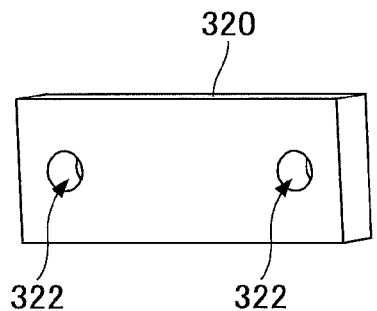
FIGS. 39A and 39B are perspective views of the lens part according to the sixth embodiment.
Figure 39B:
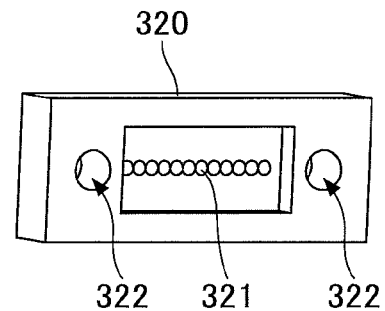
Figure 40A:
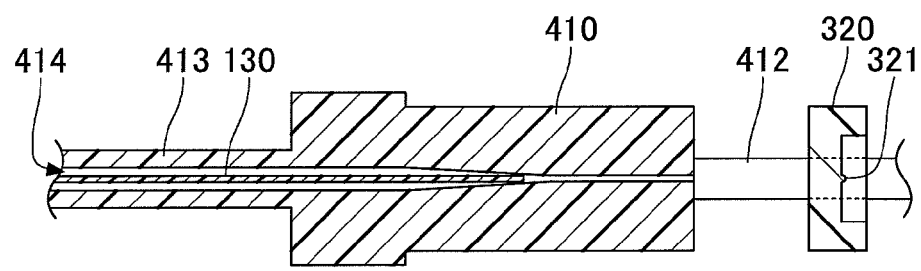
FIGS. 40A and 40B are diagrams illustrating a method of manufacturing an optical connector according to the sixth embodiment.
Figure 40B:
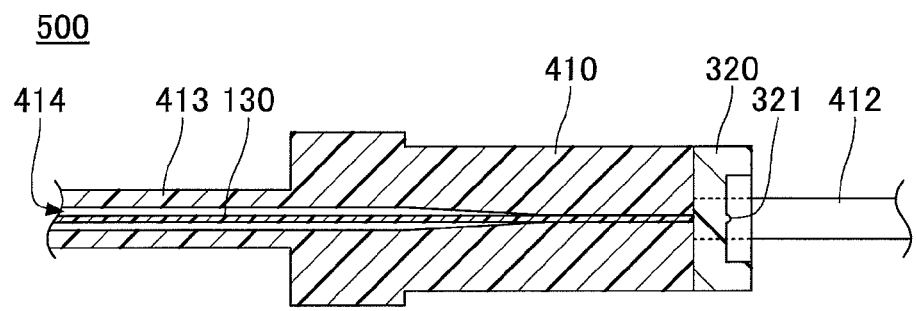

Next, a sixth embodiment is described with reference to FIGS. 36A through 40B. FIGS. 36A and 36B are perspective views of an optical connector 500 (hereinafter "connector 500") according to this embodiment. FIGS. 37A and 37B are exploded perspective views of the connector 500. FIGS. 38A and 38B are perspective views of an optical waveguide attachment part 410 (hereinafter "attachment part 410") according to this embodiment. FIGS. 39A and 39B are perspective views of the lens part 320. FIGS. 40A and 40B are diagrams illustrating a method of manufacturing a connector according to this embodiment. According to this embodiment, the attachment part 110 and the cover 350 of the third embodiment are monolithically formed, and the connector 300 is further provided with a guide for protecting a waveguide.

The connector 500 according to this embodiment includes the attachment part 410 and the lens part 320. The pin holes 322 penetrating through the lens part 320 are provided across the array of the lenses 321 from each other in the lens part 320.

The attachment part 410 includes a guide 413 for fixing the position of and protecting the waveguide 130, and two pins 412. The pins 412 are inserted through the pin holes 322 and into pin holes provided in a complementary connector that is connected to the connector 500. As illustrated in FIGS. 40A and 40B, the waveguide 130 is inserted into a groove 414 formed in the guide 413. The attachment part 410 has a geometry compliant with the MT connector standard.

The connector 500 is manufactured as follows. First, as illustrated in FIG. 40A, the pins 412 are inserted through the pin holes 322, and the waveguide 130 is inserted into the groove 414. Then, as illustrated in FIG. 40B, the lens part 320 and the attachment part 410 contacting each other are bonded, and the attachment part 410 and the waveguide 130 are bonded.

According to this embodiment, it is possible to protect the waveguide 130 and fix the waveguide 130 in a desired shape with the guide 413. The guide 413 may have a tubular shape or, although not illustrated, be open on one side.

In respects other than those described above, the sixth embodiment may be equal to the third embodiment.

According to an aspect of the present invention, it is possible to connect an optical waveguide to a desired position even when the optical connector is formed of a resin material.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An optical connector connectable to another optical connector, the optical connector comprising:
   an optical waveguide that includes a core;
   an attachment part to which the optical waveguide is attached;
   a cover that includes a through hole into which the attachment part is inserted;
   a lens part in which a positioning hole is formed; and
   a positioning pin that is provided on the attachment part and inserted through the positioning hole,
   wherein the lens part and the attachment part are joined with the positioning pin being inserted through the positioning hole, and
   the lens part and the attachment part are positioned relative to each other by the positioning pin inserted through the positioning hole.

2. An optical connector connectable to another optical connector, the optical connector comprising:
   an optical waveguide that includes a core;
   an attachment part to which the optical waveguide is attached;
   a lens part in which a positioning hole is formed; and
   a positioning pin that is provided on the attachment part and inserted through the positioning hole, wherein the lens part and the attachment part are joined with the positioning pin being inserted through the positioning hole, the lens part and the attachment part are positioned relative to each other by the positioning pin inserted through the positioning hole, and the lens part includes a hole into which the attachment part is inserted.

3. The optical connector as claimed in claim 1, wherein the lens part is attached to a first end of the cover, the first end being opposite to a second end of the cover from which the optical waveguide extends.

4. The optical connector as claimed in claim 1, wherein the attachment part includes a groove into which the optical waveguide is placed.

5. The optical connector as claimed in claim 1, wherein the attachment part includes a guide configured to fix a position of the optical waveguide.

6. The optical connector as claimed in claim 1, wherein the attachment part and the positioning pin are monolithically formed.

7. An optical connector connectable to another optical connector, the optical connector comprising:

an optical waveguide that includes a core;

a lens part formed of a resin and including a lens;

an attachment part to which the optical waveguide is attached, the attachment part being inserted into a hole formed in the lens part; and a positioning pin that is provided on the attachment part, wherein the lens part and the attachment part are joined with the positioning pin being inserted through a positioning hole formed in the lens part, and wherein the lens part covers the attachment part from a first end thereof facing toward the lens to a second end thereof opposite to the first end.

8. The optical connector as claimed in claim 1, wherein the attachment part and the cover are monolithically formed.

9. The optical connector as claimed in claim 2, wherein the attachment part includes a groove into which the optical waveguide is placed.

10. The optical connector as claimed in claim 2, wherein the attachment part includes a guide configured to fix a position of the optical waveguide.

11. The optical connector as claimed in claim 2, wherein the attachment part and the positioning pin are monolithically formed.

* * * * *